United States Patent
Alfarhan et al.

(10) Patent No.: US 11,800,397 B2
(45) Date of Patent: Oct. 24, 2023

(54) METHODS FOR LOGICAL CHANNEL PRIORITIZATION AND TRAFFIC SHAPING IN WIRELESS SYSTEMS

(71) Applicant: INTERDIGITAL PATENT HOLDINGS, INC., Wilmington, DE (US)

(72) Inventors: Faris Alfarhan, Montreal (CA); Paul Marinier, Brossard (CA); Ghyslain Pelletier, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 197 days.

(21) Appl. No.: 17/053,088

(22) PCT Filed: May 8, 2019

(86) PCT No.: PCT/US2019/031282
§ 371 (c)(1),
(2) Date: Nov. 5, 2020

(87) PCT Pub. No.: WO2019/217530
PCT Pub. Date: Nov. 14, 2019

(65) Prior Publication Data
US 2021/0144580 A1 May 13, 2021

Related U.S. Application Data

(60) Provisional application No. 62/668,585, filed on May 8, 2018.

(51) Int. Cl.
*H04W 28/02* (2009.01)
*H04L 47/215* (2022.01)
(Continued)

(52) U.S. Cl.
CPC ....... *H04W 28/0268* (2013.01); *H04L 47/215* (2013.01); *H04W 72/23* (2023.01); *H04W 76/27* (2018.02); *H04W 80/02* (2013.01)

(58) Field of Classification Search
CPC . H04W 28/0268; H04W 76/27; H04W 72/14; H04W 80/02; H04L 47/215
See application file for complete search history.

(56) References Cited

U.S. PATENT DOCUMENTS

2009/0196175 A1* 8/2009 Sammour ............. H04W 36/02
370/230.1
2010/0085874 A1* 4/2010 Noy ....................... H04L 47/215
370/230

(Continued)

FOREIGN PATENT DOCUMENTS

| WO | 2008/086509 | 7/2008 |
| WO | 2014/210221 | 12/2014 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Christopher M Crutchfield
*Assistant Examiner* — Tito Q Pham
(74) *Attorney, Agent, or Firm* — Volpe Koenig

(57) ABSTRACT

A method performed by a WTRU may comprise associating a logical channel with a plurality of token buckets, including at least a long term token bucket and a short term token bucket. The method may further comprise transmitting logical channel data on the associated logical channel, in a TTI. The transmitted logical channel data of the TTI may be no larger than a value corresponding to a minimum of the long (Continued)

term token bucket and the short term token bucket. The long term token bucket may be initialized to a value which is greater than an initialized value of the short term token bucket. When the WTRU transmits logical channel data in a TTI, the WTRU may decrement the long term token bucket and the short term token bucket by a total size of one or more MAC SDUs served on the associated logical channel.

18 Claims, 8 Drawing Sheets

(51) Int. Cl.
*H04W 80/02* (2009.01)
*H04W 72/23* (2023.01)
*H04W 76/27* (2018.01)

(56) References Cited

U.S. PATENT DOCUMENTS

| | | | | |
|---|---|---|---|---|
| 2010/0214925 | A1* | 8/2010 | Gormley | H04L 47/36 370/235.1 |
| 2011/0096666 | A1* | 4/2011 | Davari | H04L 47/215 370/235 |
| 2012/0016986 | A1* | 1/2012 | Jacquet | H04L 47/32 709/224 |
| 2014/0301195 | A1* | 10/2014 | Briscoe | H04L 47/11 370/230.1 |
| 2014/0380324 | A1* | 12/2014 | Xiao | G06F 9/5083 718/102 |
| 2014/0380330 | A1* | 12/2014 | Xiao | G06F 9/5016 718/104 |
| 2015/0236955 | A1* | 8/2015 | Bottorff | H04L 43/062 370/235 |
| 2015/0271836 | A1* | 9/2015 | Damnjanovic | H04W 72/0413 370/329 |
| 2017/0013565 | A1* | 1/2017 | Pelletier | H04W 72/0473 |
| 2017/0208606 | A1* | 7/2017 | Chen | H04W 72/10 |
| 2017/0374579 | A1* | 12/2017 | Wang | H04L 47/30 |
| 2018/0048498 | A1* | 2/2018 | Stern-Berkowitz | H04W 16/14 |
| 2018/0324835 | A1* | 11/2018 | Agiwal | H04W 72/0453 |
| 2019/0320467 | A1* | 10/2019 | Freda | H04W 74/004 |
| 2020/0029353 | A1* | 1/2020 | Xu | H04W 52/0209 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital Inc., "LCP with Delay Critical GBR flows," 3GPP TSG-RAN WG2, RAN2#102, R2-1806835, Busan, Republic of Korea (May 21-25, 2018).
Panasonic, "Scheduling Information for Uplink scheduling," 3GPP TSG RAN WG2#60, R2-074860, Jeju, Korea (Nov. 5-9, 2007).
Vodafone Group, "Overview to an implementation of the Minimum Bitrate & Priority scheme," 3GPP TSG RAN WG2#55, R2-062960, Seoul, Korea (Oct. 9-13, 2006).

* cited by examiner

METHODS FOR LOGICAL CHANNEL PRIORITIZATION AND TRAFFIC SHAPING IN WIRELESS SYSTEMS

CROSS-REFERENCE TO RELATED APPLICATIONS

This application is the U.S. National Stage, under 35 U.S.C. § 371, of International Application No. PCT/US2019/031282 filed May 8, 2019, which claims the benefit of U.S. Provisional Application No. 62/668,585 filed May 8, 2018, the contents of which are incorporated herein by reference.

BACKGROUND

In some wireless systems, high-priority or delay-critical transmissions may negatively impact cell capacity as high-priority devices may transmit more data than is expected by a network. This may have an effect on access control, for example, by negatively impacting the number of devices which may be supported. Quality of service (QoS) enforcement for flows of a similar or lower priority may also be negatively impacted since the high-priority devices may take more than their expected share of network resources.

In 3rd Generation Partnership Project (3GPP) long term evolution (LTE), radio bearers are served in order of their priority. Using logical channel prioritization (LCP), data from a logical channel having a highest priority is the first data which may be included in a medium access control protocol data unit (MAC PDU). Subsequently, lower priority data is included in the MAC PDU until the MAC PDU size is either completely filled or until there is no more buffered data remaining to transmit. The process of filling a MAC PDU is performed in three steps (steps 1-3). In step 1, all logical channels which have a bucket variable (B) for a logical channel j (Bj) which is non-empty are allocated resources in decreasing priority order. In step 2, Bj is decremented by the total size of MAC service data units (SDUs) served to logical channel j in step 1. In step 3, if any resources remain, all the logical channels for which data remains are served in a strict decreasing priority order until either the data for that logical channel or the uplink (UL) grant is exhausted, i.e. the MAC PDU is completely filled.

A WTRU may be configured with data flows having different QoS requirements. For example, with guaranteed bit rate (GBR) bearers, the radio access network (RAN) maintains a guaranteed bitrate, but data may be transmitted at a higher rate than the GBR. For a given data radio bearer (DRB), a Maximum Data Burst Volume (MDBV) is a requirement for 5G network access nodes. MDBV denotes the largest amount of data that a gNB serves a certain bearer within a period corresponding to a packet delay budget (PDB) of the DRB. MDBV ensures that the gNB has a means to control the number of served DRBs by admission control so that low priority DRBs are not starved.

For example, within a packet delay budget of 5 ms, the network may be configured to admit 20 flows if each flow does not exceed 320 bytes. However, the network may be configured to only admit 10 flows if each flow does not exceed 640 bytes. In either case, statistically, no more than 6400 bytes would be transmitted over the 5 ms period.

MDBV requirements are typically enforced by network implementation for downlink (DL) traffic. This is possible since the network is in control of both the DL data and the scheduling of the data. For UL traffic, the network cannot guarantee by scheduling alone that a bearer will not exceed its MDBV, because the LCP procedure performed by the WTRU on the UL grant is performed according to logical channel (LCH) priorities and other transport block (TB) construction rules. For UL traffic, enforcement methods are needed to ensure that high priority DRBs do not negatively impact cell admission capacity or the QoS for other flows of a similar or lower priority. Additionally, methods for ensuring that high priority DRBs do not take more than their expected share of resources are needed.

SUMMARY

A method performed by a wireless transmit/receive unit (WTRU) may comprise associating a logical channel with a plurality of token buckets, including at least a long term token bucket and a short term token bucket. The method may further comprise transmitting logical channel data on the associated logical channel, in a transmission time interval (TTI). The transmitted logical channel data of the TTI may be no larger than a value corresponding to a minimum of the long term token bucket and the short term token bucket. The long term token bucket may be initialized to a value which is greater than an initialized value of the short term token bucket. When a WTRU transmits logical channel data in a TTI, the WTRU may decrement the long term token bucket and the short term token bucket by a total size of one or more medium access control (MAC) service data units (SDUs) served on the associated logical channel.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
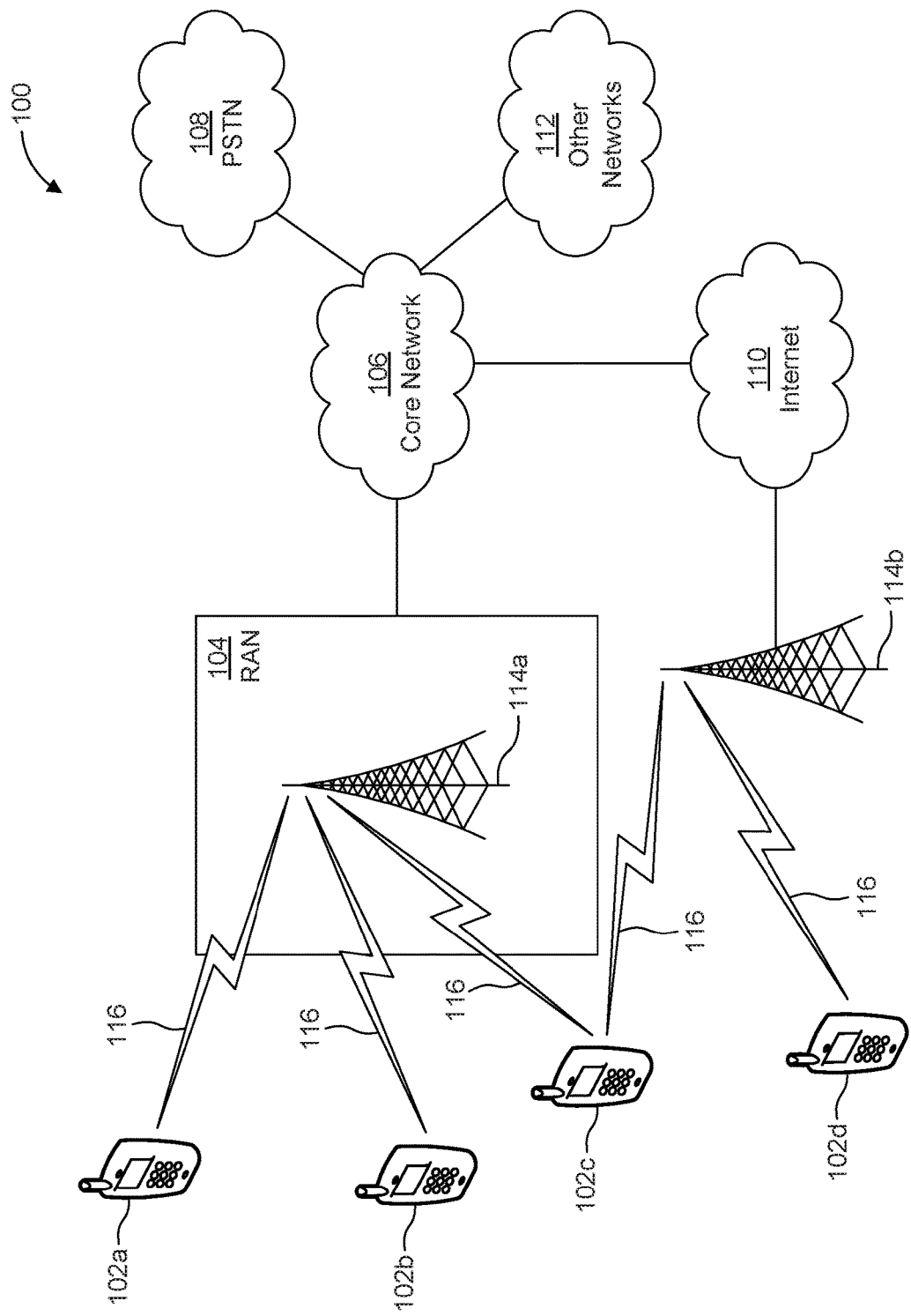
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
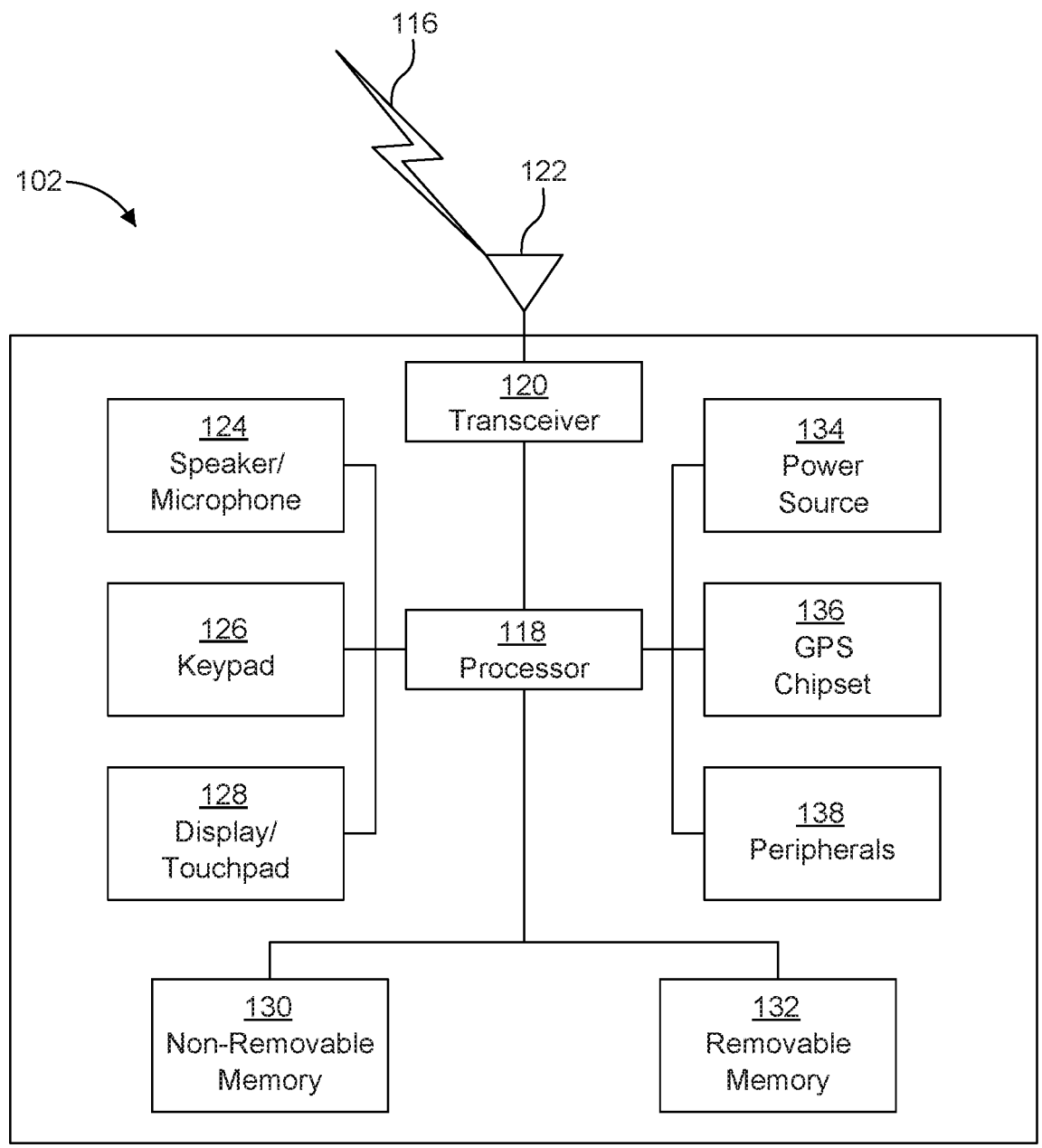
FIG. 1B is a system diagram illustrating an example wireless transmit/receive unit (WTRU) that may be used within the communications system illustrated in FIG. 1A according to an embodiment.
Figure 1C:
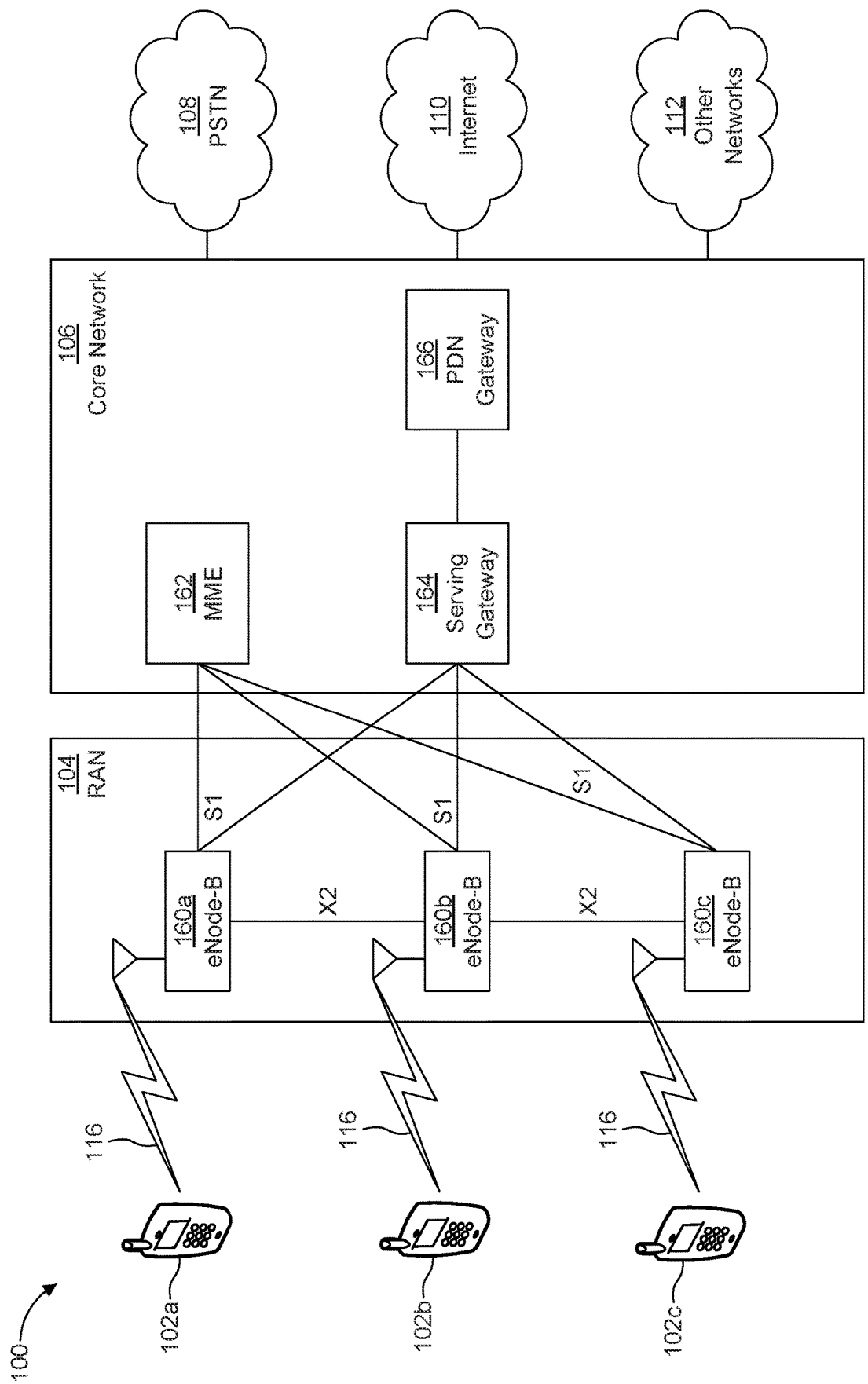
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (UL) (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an internet protocol (IP) gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as machine-type communications (MTC) devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
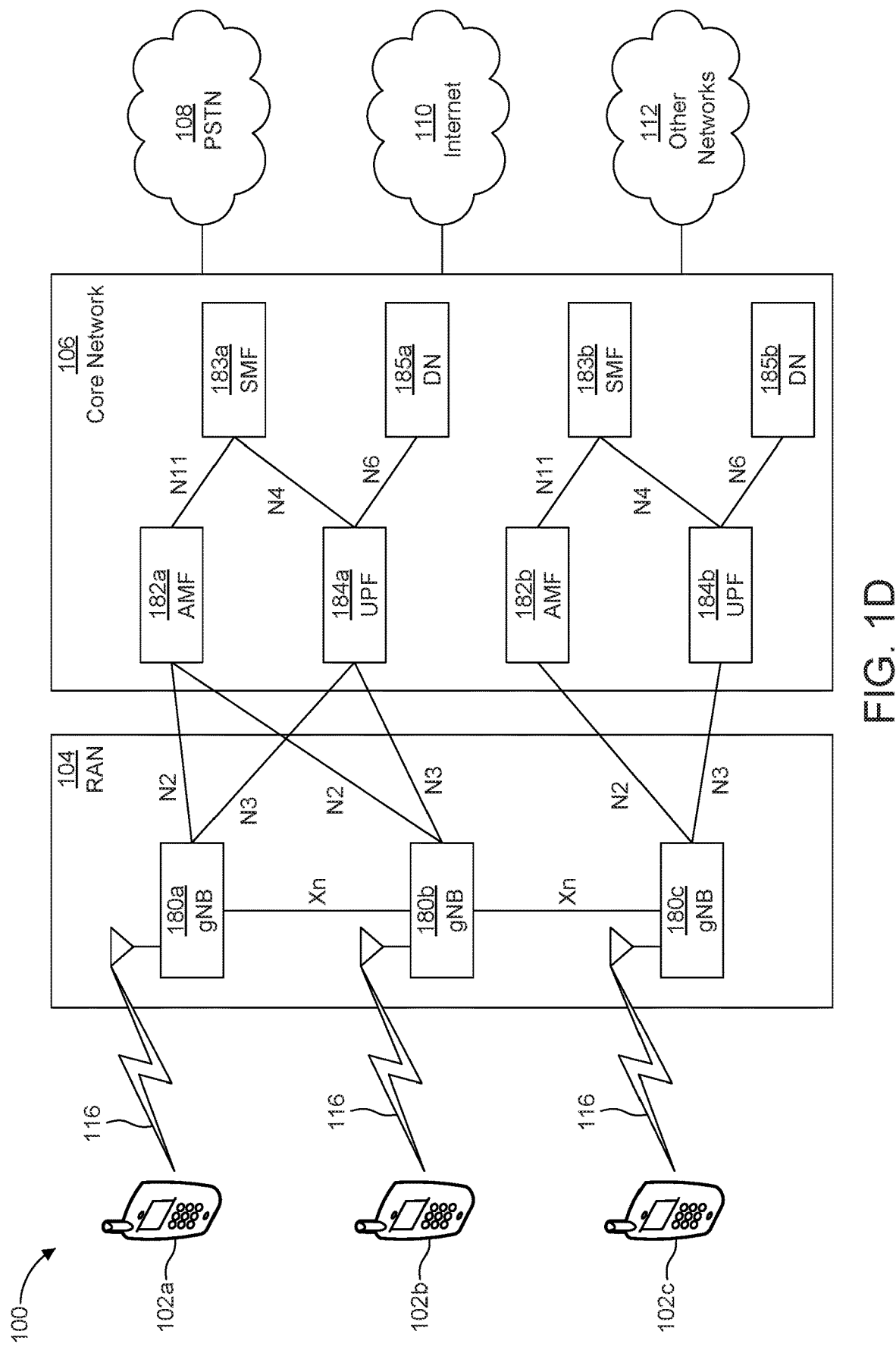
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Mobile communication technologies are in continuous evolution and are already at the doorstep of a fifth cellular incarnation—5G. As with previous generations, new use cases will largely contribute to setting the requirements for new systems. The 5G New Radio (NR) access network may enable improved broadband performance (IBB); industrial control and communications (ICC) and vehicular applications (V2X); and Massive Machine-Type Communications (mMTC) use cases. Such use cases may be enabled through one or more of the following example requirements for the 5G interface.

Support for ultra-low transmission latency communication technologies, for example, low latency communications (LLC) may enable various use cases. For example, an air interface latency as low as 1 ms round-trip time (RTT) may require support for TTIs somewhere between 100 us and 250 us. Support for ultra-low access latency including a time from initial system access until the completion of the transmission of the first user plane data unit is of interest, but is of lesser priority. IC and V2X may require an end-to-end (e2e) latency of less than 10 ms. Support for ultra-reliable transmission (URC) may enable various use cases. One example design consideration may include providing a transmission reliability that is much better than what is possible with legacy LTE systems. For example, a possible target may be close to 99.999% transmission success and service availability. Another example design consideration may include providing support for mobility for speed in the range of 0-500 km/h. IC and V2X may require a Packet Loss Ratio of less than $10e^{-6}$. Support for MTC operation (including narrowband operation) may enable various use cases. In one example, the air interface efficiently supports narrowband operation (e.g., using less than 200 KHz), extended battery life (e.g., up to 15 years of autonomy) and minimal communication overhead for small and infrequent data transmissions (e.g., low data rate in the range of 1-100 kbps) with an access latency of seconds to hours.

5G may further support legacy LTE Radio Access in addition to the NR access. For example, a WTRU may be configured for dual connectivity with LTE cells configured as a master cell group (MCG) and NR cells configured as a secondary cell group (SCG) in an E-UTRAN New Radio-Dual Connectivity (EN-DC) configuration. Various methods, systems, and devices are described herein without limitation to other use cases and/or technologies, e.g., those applicable to LTE and/or NR-based systems.

Various general principles behind LTE and NR include, for example, channel and physical layer resources, bandwidth parts (BWPs), spectrum and carrier aggregation (CA), supplementary uplink (SUL), transport block (TB) for uplink (UL) transmissions, logical channels (LCHs), logical channel grouping (LCG), logical channel prioritization (LCP) for UL transmissions, transport channels (TRCHs), and QoS-based parameters. Each of these general principles may be enhanced or modified in accordance with embodiments disclosed herein.

LTE and NR communications may employ various channel and physical layer resources. For example, in NR, a WTRU may be configured with downlink control channel resources for each cell of a configuration of a WTRU, such as one or more search space configurations or one or more CORESET configurations for each cell of the configured WTRU. The WTRU may be configured with uplink control channel resources for each cell of the WTRU's configuration such as one or more physical uplink control channel (PUCCH) configurations for each cell of the WTRU's configuration. The WTRU may be configured with physical random access channel resources for each cell of the WTRU's configuration such as one or more physical random access channel (PRACH) configurations for each cell of the WTRU's configuration. The WTRU may use such resources to perform a random access procedure and/or for beamforming management such as for establishment of beams and/or recovery from a beam failure event.

LTE and NR communications may employ bandwidth parts (BWPs) so that resources may be assigned in a flexible manner in a given carrier. For example, a WTRU may be configured with one or more bandwidth part(s) (BWP) for a given cell and/or carrier. A BWP may be characterized by at least one of a subcarrier spacing; a cyclic prefix; and/or a number of contiguous PRBs. These characteristics may be referred to as configuration aspects of the WTRU. Further, a BWP may be further characterized by a frequency location (e.g., a center frequency.)

A WTRU may be configured with an initial BWP. For example, the WTRU may be configured with an initial BWP from the reception of system information via a SIB. The WTRU may be configured to access the system using the initial BWP for a given cell and/or carrier. Such access may include at an initial access time when the WTRU is in an IDLE mode and/or determines that it should establish a radio resource control (RRC) connection to the system. The configuration of such initial BWP may include a configuration for random access.

A WTRU, for example, a CONNECTED mode WTRU may be further configured with a default BWP. The default BWP may be the same or similar to the initial BWP, or it may be different. The WTRU may revert to the default BWP at the expiration of a timer, for example, after a period of scheduling inactivity. A WTRU may be configured with additional BWPs. For example, the WTRU may be configured with a BWP for a specific type of data transfers, for example, for URLLC transmissions, eMTC transmissions or eMBB transmissions.

LTE and NR communications may employ one or both of spectrum aggregation and carrier aggregation (CA). For single carrier operation, spectrum aggregation may be supported, whereby the WTRU may support transmission and reception of multiple transport blocks over contiguous or non-contiguous sets physical resource blocks (PRBs) within the same operating band. Mapping of a single transport block to one or more separate sets of PRBs may also be supported. Support for simultaneous transmissions associated to different waveforms, transmission durations, subcarrier spacing (SCS) requirements may also be supported.

Multicarrier operation may also be supported using contiguous or non-contiguous spectrum blocks within the same operating band or across two or more operating bands. Aggregation of spectrum blocks using different modes, for example, frequency division duplex (FDD) and time division duplex (TDD) modes may be supported. Each of these modes may be configured using different channel access methods, for example, licensed and/or unlicensed band operation above or below 6 GHz, may be supported. Support for methods that configure, reconfigure and/or dynamically change the WTRU's multicarrier aggregation may be supported. The WTRU may be configured for carrier aggregation using a single MAC instance, or for multi-connectivity operation with one MAC instance per configured group of cells. A WTRU configured for dual connectivity operation may be configured with one or more cells for the MCG, and one or more cells for the SCG.

A WTRU may be configured with one or more cells including, for example, a Primary Cell (PCell) and zero or more Secondary Cells (SCells). The WTRU may be configured with one or more groups of cells denoted by a Cell Group (CG). The WTRU may be configured with one special cell (SpCell) or Primary Special Cell (PSCell) for a CG. The primary CG or MCG may always include at least one PCell. The WTRU may be configured for carrier aggregation, in which case, at least one PCell may be configured for a CG. The WTRU may be configured with multiple CGs for operation using dual connectivity.

LTE and NR communications may employ supplementary uplink (SUL) access via one or more SUL carriers. For example, a cell of the WTRU's configuration may include at least one additional uplink carrier. In NR, the WTRU may be configured with a cell including a SUL cell. One motivation for the use of an SUL may be to extend the coverage of a WTRU operating in high frequency, such that the WTRU may perform transmissions on the SUL when configured to a lower frequency band. This may be useful when the WTRU moves towards the edge of the coverage of the cell's primary uplink carrier (PUL). Another use of the SUL may be for provision of specific services, higher throughput and/or increased reliability. This may be preferable if the WTRU is configured to perform transmissions on multiple uplinks for the concerned cells concurrently or near concurrently in a time division multiplexed (TDM) fashion.

For example, the SUL may be modeled in NR as a cell with a DL carrier associated with two separate UL carriers. The uplink carrier may consist or may be comprised of of a primary UL, which may be in the high frequency band where the DL carrier is also located, and an SUL which may be in a lower frequency band. The terms PUL and SUL are used herein to refer to the regular uplink and supplementary uplink. SUL may be configured for any type of cell, including but is not limited to a primary cell (PCell), a secondary cell (SCell) as well as a secondary PCell (SPCell) for dual connectivity. The SUL may be configured for a standalone system, or for a cell of a multi-RAT dual connectivity system. The WTRU may perform initial access to a cell using either PUL or SUL. The SUL's configuration may be broadcasted in minimum SI for a cell. For example, the WTRU may select the SUL for initial access if the DL quality of the serving cell is below a configured threshold.

Different operating modes may be configured for SUL for a WTRU in RRC Connected mode. For example, in a first mode, RRC may configure the WTRU with multiple UL carriers, one of which is a PUL with a typical uplink configuration for the concerned cell, and another which may minimally include a sounding reference signal (SRS) configuration on the SUL or another carrier or cell. In such a mode of operation, the WTRU may use the PUL for all control and data transmission in the uplink. The WTRU may additionally transmit SRS using resources of the SUL. The RRC reconfiguration may provide an extended, typical and/or complete uplink configuration for a different carrier to activate and/or switch the applicable active uplink carrier for the cell for some or all transmissions.

In a second example mode, RRC may configure multiple uplinks with an extended, typical and/or complete, uplink configuration. In such case, the WTRU may have a configuration sufficient to perform some or all types of uplink transmissions, for example, PUCCH, physical uplink shared channel (PUSCH) and/or PRACH transmissions on resources of the concerned carriers. The WTRU may subsequently receive control signaling via, for example, a MAC CE or DCI that activates and/or initiates a switch between the UL configurations.

In a third example mode, multiple uplinks may be configured by RRC, and two or more uplink configurations may be active either concurrently or in a time-division fashion. Such mode of operation may include a restriction such that the WTRU may not be required to perform some or all types of uplink transmissions simultaneously. In this way, the WTRU may not be required to transmit PUSCH for the cell simultaneously on multiple uplink carriers. In some cases, such restriction may be configured for the WTRU in particular if a capability of the indicates that such simultaneous transmission is not supported, for example, for the configured frequency bands. A WTRU capability may be provided to a base station, gNB, core network or the like via a single capability identifier or a capability identifier which is indicative of a plurality of capabilities of the WTRU.

LTE and NR communications may employ transport blocks (TBs) for UL transmissions. In LTE and in NR, the NW may grant radio resources to the WTRU for a transmission on the UL shared channel (UL-SCH). The WTRU may receive such resource allocations either in one or more grants received on the Physical Downlink Control Channel (PDCCH) or in a configured resource, for example, a semi-persistently scheduled UL grant in LTE, or a type-1 grant or a type-2 grant in NR. The medium access control (MAC) layer may provide the Hybrid Automatic Repeat Request (HARQ) entity with the necessary information for the UL transmission. This information may include one or more of a New Data Indication (NDI) which controls whether or not the uplink transmission should be a new transmission or a retransmission; a transmission unit, for example, a transport block (TB) size indicating a number of bits, symbols or elements available for the uplink transmission; a redundancy version (RV); and/or a transmission duration, for example, a transmission time interval TTI, number of slots, number of symbols, time period or the like. Typically, in a single carrier system, there is at most a single TB of a given transmission duration at any given time.

A HARQ entity typically identifies the HARQ process for which the transmission should take place. The HARQ entity may also route HARQ feedback and a Modulation and Coding Scheme (MCS) to the HARQ process. The values of the NDI, TB size, RV TTI, and MCS may be controlled by the NW and may be selected to meet Quality of Service (QoS) requirements, such as the Packet Delay Budget (PDB), the Packet Error Loss Rate (PLER) and corresponding radio Block Error Rate (BLER) target of the different radio bearers established for the WTRU, based on, for example, Buffer Status Reporting (BSR) information, reported Channel Quality Indications (CQI) and/or HARQ feedback received from the WTRU.

To assemble the MAC Protocol Data Unit (PDU) for transmission, the WTRU may multiplex one or more MAC Service Data Unit(s) (SDUs) from one or different logical channels (LCHs) onto the TB to be delivered to the physical layer on the proper transport channel. Such multiplexing may include considerations for mapping restrictions between data from an LCH and a given TB based on one or more characteristics of the transmission of the TB. Such characteristics may include the SCS, the maximum PUSCH transmission duration, measured in terms of a number of TTIs, symbols or the like, the type of configured grant (e.g., type 1, type 2) and/or the serving cell(s) allowed for transmission of the data for an LCH.

LTE and NR communications may employ logical channels (LCHs). An LCH may represent a logical association between data packets and/or PDUs. Such associations may be based on data units, for example, data packets being associated to the same bearer similar to legacy methods employed in LTE.

A WTRU may be configured such that it may determine such relationships between different data units. Such relationships may be based on a matching function, for example, based on the configuration of one or more field values common to data units that are part of the same logical association. Such fields may correspond to fields in a protocol header associated with the data unit(s). For example, such matching functions may use a tuple of parameters for fields of the IP headers of the data unit, such as IP source/destination address(es), transport protocol source/destination port(s), transport protocol type, and/or IP protocol version, for example, IPv4 or IPv6.) Data units that are part of the same logical association may share a common radio bearer and/or may at least conceptually correspond to the same LCH and/or LCG.

In NR, the WTRU may be configured with a service data adaptation protocol (SDAP) sublayer. The main services and functions of SDAP may include providing a mapping between a QoS flow and a data radio bearer and marking a QoS flow ID (QFI) in both DL and UL packets. A single protocol entity of SDAP may be configured for each individual PDU session. The SDAP sublayer may support one or more of the following functions: transfer of user plane data; mapping between a QoS flow and a data radio bearer (DRB) for both DL and UL; marking QoS flow ID in both DL and UL packets; and/or reflective QoS flow to DRB mapping for the UL SDAP PDUs.

LTE and NR communications may employ logical channel grouping. A logical channel group (LCG) may include a group of LCH(s) or an equivalent where such grouping is based on one or more criteria. Such criteria may include, for example, that the one or more LCH(s) have a similar priority level applicable to all LCHs of the same LCG (similar to legacy methods), or are associated with the same type of transmissions, for example transmissions which have a same SCS, duration, waveform or the like.

LTE and NR communications may employ Logical Channel Prioritization (LCP) for UL transmissions. LCP may be used to associate data available for transmission with resources available for uplink transmissions. Multiplexing of data with different QoS requirements within the same transport block may be supported as long as such multiplexing neither introduces a negative impact to the service with the most stringent QoS requirement nor introduces unnecessary waste of system resources. The multiplexing may be preferable when the WTRU is configured with a grant for a low priority service and has data available for a higher priority service, for example, an eMBB configuration when URLLC traffic is available for transmission.

When assembling a MAC PDU, including when filling a TB with data for an UL transmission, the WTRU typically serves data from one or more LCH(s). The WTRU typically performs LCP with up to two rounds. In a first round, equivalent to steps 1 and 2), data from logical channels may be taken up to Prioritized Bit Rate (PBR) in decreasing priority order. In step 2, the WTRU typically decrements Bj by the total size of MAC SDUs served to logical channel j in Step 1. Data may exceed the available amount of data for the LCH for transmission in a given TTI (i.e., the "bucket"), typically to avoid unnecessary RLC segmentation. In a second round, equivalently, step 3, data from logical channels may be taken in strict decreasing order to fill the remaining resources.

The term "bucket" will be understood by one skilled in the art as a metaphor and may not necessarily be implemented by any particular data structure or memory format. For example, a bucket may be used to represent a quantity of data with which a WTRU may transmit at any given time instant or during a time period. The bucket may be implemented by decrementing a value upon transmission, i.e. the buffer is emptied. The bucket may be incremented upon a time period elapsing in which either no transmission is made or in which a transmission is made which uses less than a given quantity of data. There may be multiple buckets, for example, two or more buckets used for each logical channel.

LTE and NR communications may employ transport channels (TrCHs). A TrCH may include a specific set of processing steps and/or a specific set of functions applied to data information that may affect one or more transmission characteristics over the radio interface. Multiple types of TrCHs may be supported, including, for example, the Broadcast Channel (BCH), the Paging Channel (PCH), the Downlink Shared Channel (DL-SCH), the Multicast Channel (MCH), and the Uplink Shared Channel (UL-SCH), in addition to the Random Access Channel (which typically does not carry any user plane data). The DL-SCH and the UL-SCH, for the downlink and for the uplink, respectively, may be considered as main transport channels for carrying user plane data. Other channels may include a common control channel (CCCH), dedicated control channel (DCCH) or dedicated traffic channel (DTCH).

LTE and NR communications may employ QoS-Based parameters. The WTRU may be configured with one or more parameters associated with a characterization of how data should be transmitted. Such characterizations may represent constraints and/or requirements that the WTRU is expected to meet and/or enforce. The WTRU may perform different operations and/or adjust its behavior as a function of the state associated to the data based on such characterization. Such parameters may include, but not be limited to, time-related aspects, for example, Time to Live (TTL) for a packet, which represents the time before which the packet should be transmitted to meet, acknowledged, etc. to meet latency requirements, rate-related aspects, and/or configuration related aspects including an absolute priority. Such parameters may also be changed with time while the packet or data is pending for transmission. In some embodiments, QoS may be based on a 5G QoS Identifier (5QI), a quality class indicator (QCI) or a pro-se per packet priority (PPPP) in the case of proximity services or sidelink transmission. A flow or bearer may be identified using a QoS flow identifier (QFI) and reflective QoS may be indicated using a reflective QoS indicator (RQI).

Flow Priority Indicator (FPI) and Flow Priority Level (FPL) parameters may be included in the QoS framework definition for NR. FPI may define priority per flow treatment at user plane (UP) and access network (AN) functions and may correspond to scheduling priority as well as priority handling in the case of congestion. The FPI may differentiate between traffic flow aggregates mapped to the same QCI and may also indicate whether the flow requires a configured guaranteed flow bitrate and/or maximum flow bitrate. The FPL may define the flow's relative importance to access an AN resource. Further, the FPL may indicate whether the access to AN non-prioritized resources should be pre-emptable and whether resources allocated should be protected from pre-emption. A QoS policy may include at least one of an FPI, FPL, prioritize/guaranteed/aggregated bit rate, packet loss rate, packet delay budget (PDB), maximum transmission delay, jitter, inter-packet delay or the like.

One example characteristic of a Delay Critical Guaranteed Bit Rate (GBR) flow is the Maximum Data Burst Volume (MDBV). The MDBV may represent the largest amount of data that the access network is required to serve for a given flow within a period of PDB which period may correspond to the delay of the data while in the access network itself.

A WTRU may transmit data units corresponding to user or control plane traffic associated with flows having different QoS requirements. A WTRU may have access to resources or different sets thereof and/or processing functions or chains thereof that offer or exhibit different service characteristics from the perspective of QoS enforcement and/or guarantees. The WTRU may determine how to associate data units with such resources and/or processing functions as part of the logical channel prioritization (LCP) function.

Some embodiments relate to how an access network may enforce a Maximum Data Burst Volume (MDBV). It may be expected that the gNB will use the MDBV within the radio admission control to determine how delay critical GBR bearers may be supported in a cell concurrently. With GBR bearers, the RAN provides some form of QoS guarantees that a flow will be served with at least the guaranteed bitrate; however, flows and applications may send at a higher rate than the GBR for some reason including, for example, codec rate adaptation, misbehaving implementations or the like. In such cases, the network may account for statistical variations when performing admission control thereby reducing the number of Delay Critical GBR bearers served in a cell, as well as other bearers. For example, a WTRU may be denied access if the number of Delay Critical GBR bearers exceeds a configured threshold. Alternatively, a WTRU may be instructed to only instantiate X flows, which may be based on a gNB threshold.

Some embodiments relate to network enforcement of a MDBV and a maximum rate over a period which may be a longer period than is configured in LTE. Such enforcement may enable the network to efficiently perform admission control and enforce MDBV for Delay Critical GBR bearers. These embodiments may include modifications to the behavior and/or configuration of a WTRU. These embodiments may include signaling enhancements to the PHY, MAC, RLC layers or higher layers.

The network may generally police and/or shape traffic for different bearers. Shaping and policing may be useful to reduce or minimize the impact of delay tolerant flows to Delay Critical GBR flows and/or their respective impacts in between such flows of similar priorities. This also may be useful to increase or maximize cell capacity.

Network elements may be configured with tools and a flexible implementation including a scheduler to control the multiplexing functions for uplink transmissions of one or more WTRUs. For example, a scheduler implementation may benefit from prioritizing a particular flow in LCP step one but may limit the priority during shaping performed in step 3 or ensuring any resource it takes in step 3 does not impact other flows irrespective of priority. This is referred to as policing. Policing may also apply at other steps, including step 1 and step 2.

Some implementations may include modified or additional buckets utilized at LCP. A short-term bucket to enforce PBR and a long-term bucket to enforce MDBV may be combined, in embodiments, to ensure transmission fairness. Some embodiments consider a bucket state for the LCH in absolute prioritization, using either the bucket related to the PBR or an equivalent, to the MDBV or an equivalent or both. Having an additional bucket may have an added benefit of controlling traffic in the short term, for example, using a higher rate PBR and a certain bucket size. In the long term, traffic may be controlled in the case of irregular traffic arrivals, for example, by using a lower rate PBR. Parameters corresponding to each of the short term bucket and the long term bucket may be configured via DCI, MAC or RRC signaling.

Without limiting the applicability of the methods and devices described herein, such methods and devices are applicable to LCP functions involved in the selection and/or multiplexing of data from bearers for uplink transmission in a wireless or wired system, such as LTE or NR. The methods may also be applicable from the perspective of a base station or TRP for downlink transmission(s) to a WTRU as well as for sidelink transmissions from WTRU to WTRU. In some embodiments, for example, remote radio heads and relay nodes may be subjected to similar prioritization problems as WTRUs.

In some embodiments, a WTRU may be configured with one or more LCHs, where an LCH may be further configured with a plurality of buckets, for example, two buckets. After being configured with a number of buckets and applicable bucket parameters, a WTRU may perform a LCP procedure where at least one logical channel (j) is associated with at least one additional bucket of the plurality of configured buckets. Additional buckets may be applicable to all or subset of steps within the resource allocation procedure.

Such approaches may enable proper treatment of a traffic flow that may have multiple QoS characteristics or requirements over different time scales. These multiple QoS characteristics may change over time or may be elements of a single QoS metric. An example of such flow is a delay critical GBR QoS flow that has both a guaranteed flow bit rate (GFBR) applicable on a long-term basis and a maximum data burst volume (MDBV) applicable over a short-term duration corresponding to the packet delay budget (PDB). Each bucket may be used to determine whether the traffic served for a logical channel would meet or exceed a bit rate requirement over a specific time scale. Without loss of generality, it will be assumed for the following examples that logical channel j is associated with two (2) buckets, denoted Bj and B'j (or in some cases, $C_j$). Three or more buckets may also be configured in accordance with the embodiments disclosed herein.

The WTRU may set an additional bucket B'j according to at least one of the following: (1) the bucket B'j may be initialized to zero (0) when the logical channel is established and may be incremented upon some condition(s) before transmission is allowed. Alternatively, the bucket B'j may be initialized to a value corresponding to (PBR'×BSD') to ensure that prioritization may be applied immediately upon logical channel establishment. The initialization value may also be configured to be less than a maximum value. (2) The bucket B'j may be incremented at a rate of PBR' where PBR' represents an additional prioritized bit rate parameter that may be set to a different value than the PBR associated with the first bucket Bj. In other words, B'j may be incremented by the product (PBR'×T) if T is the time interval between two updates of B'j. Incrementing the bucket may be performed linearly or at a rate which is greater than or less than linear. (3) Each bucket may be incremented using the same time interval T, or using a bucket-specific time interval Tj and Tj if configured. In some embodiments, T may further represent a minimum amount of time that may have elapsed before the WTRU may update the concerned bucket. (4) The bucket B'j may have a maximum value of (PBR'×BSD'), where BSD' represents an additional bucket size duration parameter that may be set to a different value than the BSD associated to the first bucket.

In an example, the WTRU may be configured according to one of the following: (1) The WTRU may determine that there is a single bucket for a given LCH (or LCH type), by default, if the configuration of a second bucket is not present in a configuration message, received via RRC for example. In such cases, the WTRU may consider whether or not a second bucket is configured in the LCP procedure to determine what, if any, further actions to take. (2) The WTRU may determine that there are two buckets for a given LCH or LCH type by default, independently of whether or not a configuration for a second bucket is present in the configuration message. If such a configuration is not present, the WTRU may configure the second bucket with a set of default parameters, for example, the value of the concerned bucket may be "infinite", or any other suitable parameter. In such cases, the absence of a configuration of a second bucket may not restrict the steps for which the concerned bucket is applicable.

The parameters PBR', BSD' and optionally T' may be obtained from MAC signaling, for example via a MAC CE. Alternatively or in combination, the parameters may be configured by higher layers including an RRC layer. When executing an LCH prioritization procedure using two buckets for at least one LCH, the WTRU may serve LCHs based on at least one of the following principles: allocation up to the minimum (or maximum) values of the buckets: In some embodiments, in an allocation step (such as the first allocation step), an LCH configured with two buckets may be allocated resources based on the minimum value across the buckets. In other words, in an LCH, j may be allocated resources only if both buckets Bj and B'j are positive. In some embodiments, an LCH, j, may be allocated resources which do not exceed either bucket or, alternatively, may be allocated resources which represent a configured minimum even though the buckets may be positive (or may be empty). Other LCHs configured with a single bucket may be allocated resources based on the value of this bucket as usual, for example, within the same allocation step, based on priority. Such approaches may permit prioritization such that the corresponding flow is not served in priority if the short-term bit rate would exceed a short-term bit rate requirement, for example, an MDBV over PDB requirement, or if the long-term bit rate would exceed a long-term bit rate requirement, for example, GFBR. In some embodiments, the values of two buckets Bj and B'j may be decremented by the total size of MAC service data units (SDU) served to the associated LCH j.

Figure 2:
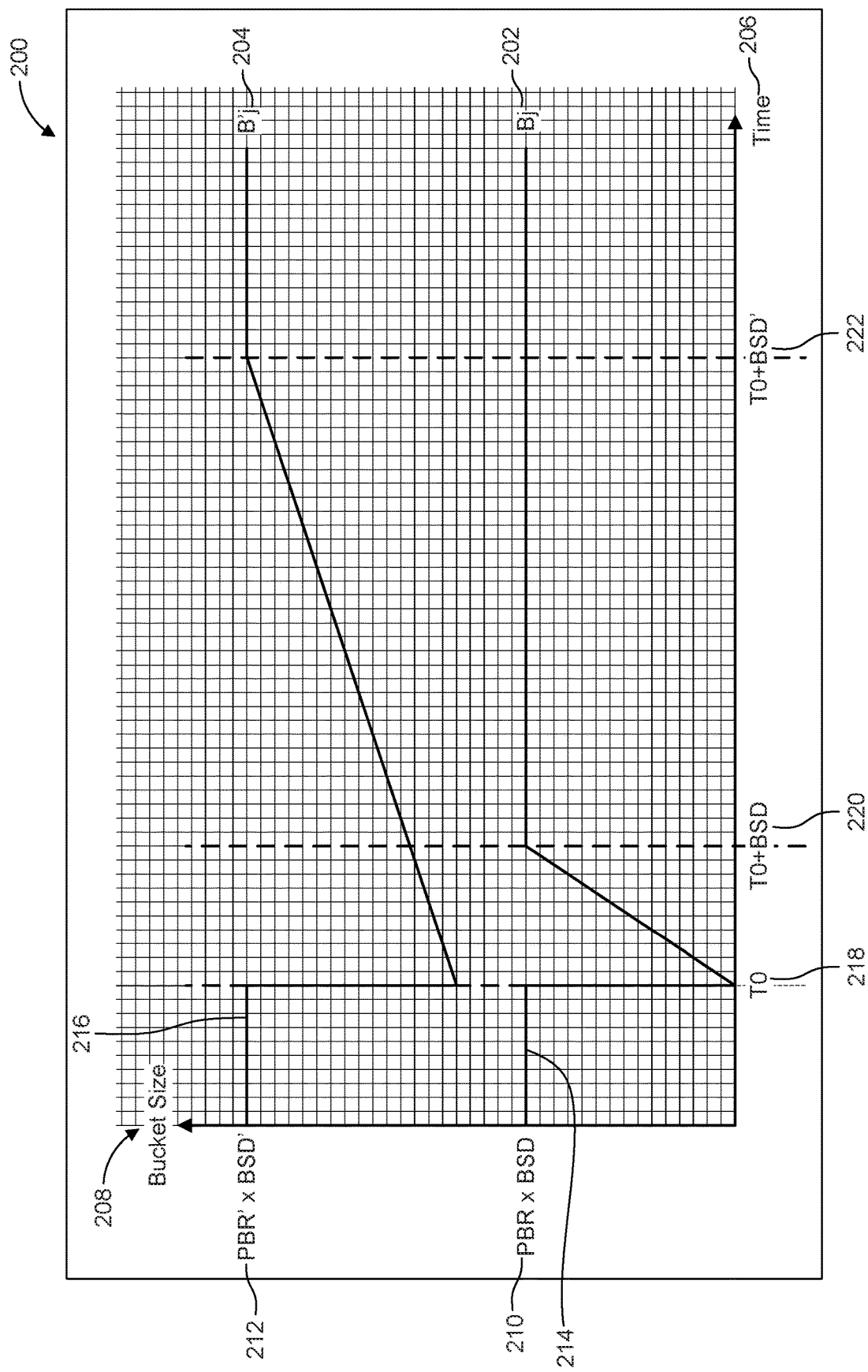
FIG. 2 is a graph illustrating an example of how the values of buckets Bj and B'j may evolve with time.

FIG. 2 is a timing graph 200 which shows an example of values of buckets Bj 202 and B'j 204 as they evolve over time. Referring to FIG. 2, the x-axis represents time 206 and the y-axis represents bucket size 208. Initially, bucket Bj 202 represents PBR×BSD 212 and B'j 204 represents PBR'× BSD' 210. Initially, both buckets Bj 202 and B'j 204 are set at a maximum level, i.e. Bj 202 is initialized at maximum level 214 and B'j 204 is initialized at maximum level 216. Both maximum values may be the same or different values. Initialization values may be provided via RRC, MAC, DCI and/or may be preconfigured or received via a higher layers, for example, an application layer. In the example shown, both buckets remain constant for a period prior to T0 218. At time T0 218, logical channel j is served. When the logical channel j is served, in this embodiment, both buckets are completely emptied. Bucket Bj 202 fills in time T0+BSD 220, while bucket B'j 204 fills at time T0+BSD' 222. The fill rates may be linear, as shown, or alternatively may fill at other faster or slower rates, for example, at exponential rates. Both buckets are completely filled by time T0+BSD' 222. In an embodiment, a transmitter may transmit at a rate in accordance with a minimum bucket size of either size. Other transmit rates may be used.

In the example shown in FIG. 2, at time T0 218, both buckets Bj 202 and B'j 204 have an equal effect on transmission size because both buckets are initially of a same value and decrease at a same rate. However, a distinction should be noted with respect to the time period between T0 218 and time period T0+BSD 220. At any time during this time period, if a buffer of the logical channel j were to become non-empty, the WTRU may select data for transmission based only upon bucket Bj 202. This is because, at all instances in this time period, aside from T0 218, bucket B'j 204 has a value which is lower than the value of Bj 202. Thus, bucket B'j 204 has a limiting effect on the transmitter during this time period.

Similarly, in the time period T0+BSD 220 to T0+BSD' 222, bucket B'j 204 has a lower value bucket Bj 202 at time instances other than T0+BSD' 222 in which the two values are equivalent. Thus, bucket B'j 204 may remain as the limiting bucket for the transmission buffer of the WTRU for time period T0+BSD 220 to T0+BSD' 222.

In some embodiments, an LCH configured with two buckets may be allocated resources based on the maximum value across the buckets. Such approaches may permit serving the corresponding flow in priority if the bit rate over at least one time period, short-term or long-term, would not exceed an associated requirement. In some embodiments, the values of two buckets Bj and B'j may be decremented by the total size of MAC SDU served to the associated LCH j. In some embodiments, these values may be floored to zero (0).

Figure 3:
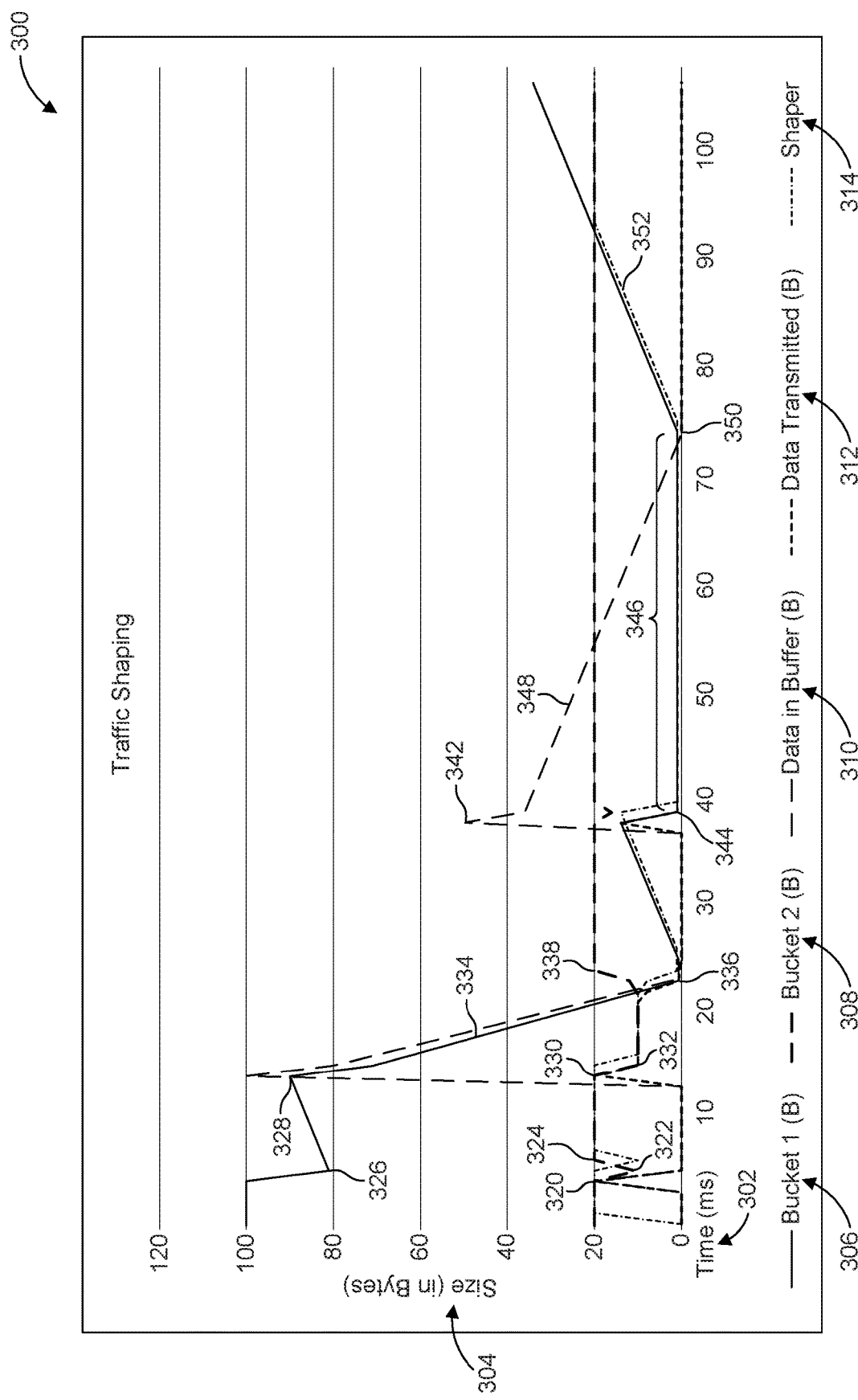
FIG. 3 is a graph illustrating another two bucket example.

FIG. 3 is a timing graph 300 which illustrates another two bucket example. In this example, both buckets 306, 308 affect an amount of data transmitted at various points in time. The x-axis represents time (in ms) 302 and the y-axis represents a data size (in bytes) 304. Bucket 1 306 is configured with a 100 byte size and bucket 2 308 is configured with a 20 byte size. In this example, bucket 1 306 is filled (incremented) over 100 ms, while bucket 2 308 is filled much quicker, i.e. over 2 ms. Thus, bucket 1 306 fills at a rate of 100 bytes/100 ms or 1 byte per ms. Bucket 2 308 fills at a rate of 20 bytes over 2 ms or 10 bytes per ms. In this way, bucket 2 308 may never fall below 10 bytes since with each passing time instant, bucket 2 308 increases at a rate of 10/20 bytes, i.e. bucket 2 308 becomes at least half filled with each passing time instant.

As shown in FIG. 3, both buckets 306, 308 are initialized full, i.e. bucket 1 306 is initialized at 100 bytes and bucket 2 308 is initialized at 20 bytes. At time 320, 20 bytes of buffered data 310 becomes available for transmission and the 20 bytes are subsequently transmitted. This causes bucket 2 308 to drop 322 and subsequently resume 324 to a full state within 2 ms. Similarly, bucket 1 306 drops 326 and more slowly resumes until time 328 in which buffered data 310 again becomes available for transmission. The data transmission of the newly buffered data begins at 20 bytes in one transmission 330 and subsequently falls to a period 332 in which only 10 bytes are transmitted at a time. During this period, bucket 1 is decremented 334 until eventually all buffered data is transmitted and no more data in buffer 310 remains. Subsequent to time 336, bucket 2 308 completely fills by time 338, yet bucket 1 306 only reaches a local maximum at time 340. This is due to 50 bytes of data becoming available in the buffer by time 342. Upon transmitting, the WTRU only transmits data up to the bucket size of bucket 1 306. Bucket 1 306 is subsequently decremented by the same amount to become empty at time 344.

During time period 346, bucket 1 306 is shown constant at 1 byte due to the empty bucket being incremented by 1 byte every ms and subsequently decremented upon transmission of the byte. Similarly, in the same period, the data in buffer 310 decreases 348 until no more data is available at time 350. During the remaining time shown, bucket 1 306 increments linearly 352 at 1 byte per ms as no new data enters the bucket.

It should be noted that bucket 2 308 has remained at full fill since time 338 even though the WTRU has transmitted data. This is due to the fact that bucket 1 306, in each subsequent transmission instant, always remained below 20 bytes, i.e. the capacity of bucket 2 308. Shaper 314 follows the minimum of bucket 1 306 and bucket 2 308. In an embodiment, data transmitted 312 will never exceed shaper 314.

In some embodiments, the WTRU may, after each allocation step, decrement the values of all buckets by the total size of MAC SDU served to the associated LCHs during the step. Alternatively, a smaller value may be decremented on a condition that the network is experiencing load which is below a configured threshold. Similarly, the value may be incremented quicker in the same circumstance. In some embodiments, an allocation step may be performed only if resources remain after completion of a previous allocation step.

Some embodiments provide methods and devices for prioritization using negative buckets. This may include, for example, strict bucket enforcement and loose bucket enforcement. In strict bucket enforcement techniques, MDBV may be strictly enforced by not allocating resources in step 1 or step 3 beyond one or more LCH bucket size, or beyond a slightly negative value to provide some leeway to allow whole SDUs to be transmitted without segmentation. This may alleviate subsequent small transmissions at a cost of not strictly performing bucket enforcement. In such cases, the WTRU may benefit from a proper configuration of the applicable PBR(s) and bucket size(s) to minimize and/or avoid excessive buffering at the WTRU. Strict enforcement may be applied to the LCP procedure by considering whether the bucket(s) is or are positive in all LCP steps, as well as subtracting the size of the MAC PDUs allocated in all steps from the bucket(s). Examples of strict bucket enforcement are discussed herein relating to single bucket, dual bucket and multiple bucket techniques.

In some embodiments, the WTRU may determine that an LCH may be served in LCP step 3 if, or if and only if, at least one of the bucket(s) applicable to the concerned LCH is non-negative, for example, $B_j$ in case of a single bucket, $B_j$ and $C_j$ in case of dual buckets. In some embodiments, the WTRU may subtract an amount, for example, the amount of data served in a MAC PDU in the LCP step 3 from the buckets applicable for the concerned LCH. In some embodiments, the WTRU may subtract the amount of data served in a MAC PDU in the LCP step 3 from a single bucket, for example, bucket $C_j$ in case of two buckets, in order to only impact the limitation enforced by the concerned bucket, e.g., the long term allowed data rate.

Strict enforcement of MDBV requirements in both step 1 and step 3 may lead to resource waste in step 3. This may be the case when the WTRU has no other LCH that may be served using the concerned resources. This may occur if the remaining grant size is larger than the amount of data allowed to be transmitted in step 3 considering strict enforcement. Accordingly, non-strict or "loose" enforcement may be realized by decrementing bucket(s) corresponding to the LCHs in step 3 as well. The LCP implementation may allow resource allocation even if the bucket(s) is or are empty or negative, including resource allocation in LCP step 3. The amount of resources allocated in step 3 may therefore be subtracted from the bucket(s), and the bucket(s) may be negative in value. Examples of loose enforcement are further discussed herein with respect to one, two or multiple buckets.

Changes in prioritization may occur on a dynamic basis. For example, a WTRU may be configured to determine the priority of an LCH and may perform such determination for a given period. The WTRU may determine the priority of data associated to an LCH before it determines what LCH may be considered in the LCP process. In some cases, the WTRU may perform such determination for different steps of the LCP process. The WTRU may be configured to determine that it should use a specific priority value for an LCH and/or that such priority has changed. The WTRU may perform such determination following the occurrence of some event. Such events may be application specific, protocol specific or may include NW signaling.

In the case of NW signaling, for example, the WTRU may receive downlink control signaling including a downlink control information (DCI), a MAC control element (CE) or a RRC PDU. Such signaling may indicate that the priority of an LCH may be changed and may be set to a specific value, lowered, increased, set to a highest value, set to a lowest value or the like. Alternatively, such signaling may indicate one or more other parameters for a given LCH, for example, a PBR value, a PSD value or the like. Alternatively, such signaling may activate and/or configure an additional bucket, for example, $C_j$ for activating a dual bucket processing. Alternatively, such signaling may indicate that the WTRU should refrain from serving data from a specific LCH. In this way, the WTRU may consider service for the LCH to be suspended. Such signaling may include a period during which the change is valid, after which, the WTRU may revert to the set of parameters previously applicable.

A priority of a LCP may be lowered or increased using a fixed value, for example, −2, −1, +1, +2 or the like. Alternatively, the WTRU may maintain a table of priority values for which the NW may signal an identifier such that the WTRU may select a given priority. In some embodiments, the WTRU may select a change in priority value in an autonomous fashion, based in part on application layer demands, measurements, handover or the like.

Such events may include the elapse of a time period, or a time-related state of the LCH. For example, the WTRU may make the determination based on a timer such as a suspendLCH-timer, a prohibitLCH-timer or a burstLCH-timer. Such events may include a function of the servicing state of the LCH. For example, the WTRU may determine that a bucket for the LCH is empty, zero or negative; that a PBR is satisfied for the LCH; and/or that data for the LCH may be multiplexed in a MAC PDU.

Such events may include a function of a configured aspect. A function may include a mapping of priorities to mapping restrictions. For example, the WTRU may determine the priority of data associated to an LCH as a function of the mapping restrictions. For example, the WTRU may be configured with mapping restrictions such that if one or more mapping criteria are met, the WTRU may consider the LCH in the LCP procedure. For a given transmission step, the WTRU may use different priority rules. For example, for one step, the WTRU may use a first priority value, while the WTRU may use a second priority value for one or more other steps.

Such events may include a function of the per-packet QoS including a QFI, or based on another field of the SDAP. For example, the WTRU may determine the priority of data associated to an LCH as a function of the QoS priority associated with a data unit. For example, the WTRU may determine a priority level for data served for a given LCH as a function of the QFI field in the SDAP header of a packet for transmission. The association between a priority for the LCH and a QFI value may be a configuration aspect of the WTRU. As the QFI value changes, an associated priority of the LCH may change accordingly.

Such priority changes may be applicable until a next event that again changes the priority of an LCH. Such priority changes may be applied for all steps of the LCP processing, only for the step based on satisfying PBR in step 1, only for step 3 based on absolute prioritization or for both steps.

In some embodiments, the priority order may depend on the allocation step. This approach may improve fairness between LCHs of a single device. The priority order applicable to an allocation step may depend on the outcome of a previous allocation step. For example, it may depend on the value of a bucket, for example, the bucket with the highest value for an LCH configured with two buckets. For example, the WTRU may prioritize LCHs with highest non-empty buckets among LCHs configured with two buckets. The priority order applicable to a specific allocation step may be configured by higher layers via MAC or physical layer (PHY) layer signaling. The priority order applicable to a specific allocation step may depend on the number of buckets configured for the LCH. For example, LCHs configured with two buckets may have higher priority than LCHs configured with a single bucket. The order of priority may depend on the allocation step. For example, LCHs configured with two buckets may have higher priority than LCHs configured with a single bucket in a first allocation step, and may have lower priority than LCHs configured with a single bucket in a subsequent allocation step. The priority order may depend on a property of the resource, such as a serving cell, an UL carrier (UL or supplementary UL), a PUSCH duration, a type of grant (dynamic or configured, type 1 or type 2). The priority order may depend on whether the logical channel is associated to a bearer for which PDCP duplication is configured or activated. For example, a transmission on a supplementary UL carrier may have a higher or lower priority than a transmission on a regular UL carrier. In some embodiments, a timing aspect may be considered. If, for example, a SUL was recently activated, a priority of the SUL may be greater than or less than the priority of the RUL.

A prioritization for PBR-based multiplexing may change dynamically. For example, regarding step 1, the WTRU may be configured to determine that the priority of an LCH should be modified upon the occurrence of a specific event, such as one of the examples described above. The WTRU may determine, for example, that the priority of an LCH may be decreased to a configured value, or to the lowest priority only for the step based on satisfying PBR as in step 1. This may be useful to ensure that overprovisioning of granted resources for a WTRU may be available to other GBR bearers of equal or lesser priority.

Absolute prioritization may change dynamically. For example, regarding steps 2 and 3 as discussed herein, the WTRU may be configured to determine that the priority of an LCH should be modified upon the occurrence of a specific event, such as one described above. In one example, the WTRU may determine that the priority of an LCH may be decreased to a configured value, or to the lowest priority only for step 3 which is based on absolute prioritization. This may be useful to ensure that overprovisioning of granted resources for a WTRU may be available to other non-GBR bearers of possibly equal or lesser priority.

Some embodiments relate to time-based multiplexing restrictions. For example, the WTRU may be configured to determine whether an LCH may be served or not for a transmission as a function of a state of the LCH. Such states may include an active state or suspended states and may be controlled as a function of time. In cases where LCH is configured with multiple buckets, such may correspond to the short-term prioritized rate e.g., the maximum burst data volume. The WTRU may perform such determinations for all steps of the LCP procedure or for less than all steps.

The WTRU may be configured with a timer such as a suspendLCH-timer. RRC may configure an initial value for the timer. Such timers may be configured for a given LCH. The WTRU may serve the associated LCH for any steps of the LCP procedure when the timer is not running, has stopped, or has expired. In such cases, the LCH may not contend for any resource in LCP for some periods. Thus, in these periods, the LCH may be suspended. In some embodiments, the WTRU may start the timer if the WTRU determines that the bucket for the LCH is empty, zero or negative; if the WTRU determines that the PBR is satisfied for the LCH; if the WTRU determines that data for the LCH may be multiplexed in a MAC PDU; a combination of any of these; and/or if the WTRU receives downlink control signaling that starts, restarts or stops the timer.

In some embodiments, the WTRU may be configured to determine whether an LCH may be served or not for a transmission as a function of a bucket state. In case of an LCH configured with multiple buckets, this may correspond to the short-term prioritized rate including the maximum burst data volume. The WTRU may perform such determination for step 3 which is based on absolute prioritization.

The WTRU may be configured with a prohibitLCH-timer timer so as to prohibit an LCH process for a period of time. An initial value for the prohibitLCH-timer or any other timer may be configured via the RRC layer or another layer. One or more timers may be configured for a given LCH. The WTRU may serve the associated LCH for step 3, i.e. the step based on absolute prioritization, when the timer is not running, has stopped or has expired. In such cases, the LCH may not contend in the absolute priority-phase of LCP for some periods. In some embodiments, the WTRU may start the timer based on: whether or not the WTRU determines that the bucket for the LCH is empty, zero or negative; whether or not the WTRU determines that the PBR is satisfied for the LCH; whether or not the WTRU determines that data for the LCH may be multiplexed in a particular MAC PDU; a combination of any the above; or if the WTRU receives downlink control signaling that starts, restarts or stops the timer. Alternatively, a similar method may be applied only for determination of whether or not an LCH may be served in the step based on satisfying PBR in step 1. In such cases, the LCH may not contend in the PBR-phase of LCP for some periods which may also be controlled by a timer. In some embodiments, the WTRU may not update the concerned buckets while the timer is running.

The WTRU may be configured to determine whether an LCH may be served or not for a transmission as a function of the time elapsed since it was last served, since its PBR was last met, or since its bucket was last zero or negative. In cases where an LCH is configured with multiple buckets, this may correspond to the short-term prioritized rate, for example, the MBDV rate. In some embodiments, the WTRU may perform such determinations only for the step based on satisfying PBR (e.g., step 1), only for the step based on absolute prioritization (e.g., step 3), or for both.

The WTRU may be configured with a burstLCH-timer timer.) RRC layer signaling may configure an initial value for the timer and/or a periodically updated value for the timer. Such timers may be configured for a given LCH. The WTRU may serve the associated LCH when the timer is not running, has stopped or has expired. The WTRU may start the timer based on: if the WTRU determines that the bucket for the LCH is empty, zero or negative; if the WTRU determines that the PBR is satisfied for the LCH; if the WTRU determines that data for the LCH may be multiplexed in a MAC PDU; a combination of any of the above; or if the WTRU receives downlink control signaling that starts, restarts or stops the timer. In some embodiments, the WTRU may not update the concerned buckets while the timer is running. Alternatively, one of the buckets may be updated while other buckets are not.

Some embodiments relate to determination of LCH applicable for prioritization. For example, a WTRU may determine whether an LCH is applicable or not to a specific LCP prioritization round as a function of whether the LCH is configured with a single bucket or whether the LCH is configured with multiple buckets. For example, the WTRU may determine that an LCH configured with a second bucket may be considered in a first round using a PBR-based prioritization using a first bucket, in a second round using PBR-based prioritization using a second bucket, but not in a third round of prioritization using absolute prioritization.

In some examples, the WTRU may determine whether an LCH is applicable or not to a specific LCP prioritization round as a function of a state of a bucket. For example, the WTRU may determine that an LCH configured with a second bucket may be considered in a first round using PBR-based prioritization using a first bucket if the first bucket is non-negative, in a second round using PBR-based prioritization using a second bucket if the second bucket is non-negative and in a third round of prioritization using absolute prioritization if the second bucket is non-negative.

Additional LCP prioritization rounds may be performed for rate limiting purposes. For example, a WTRU may perform one additional round of prioritization or one or more additional steps in the LCP procedure according to any one or more of the methods described herein. In some embodiments, an additional allocation step is introduced into the procedure if at least one LCH is associated with two buckets. Such additional allocation steps may be used, for example, to apply different prioritizations between LCHs configured with two buckets and LCHs configured with a single bucket.

Figure 4A:
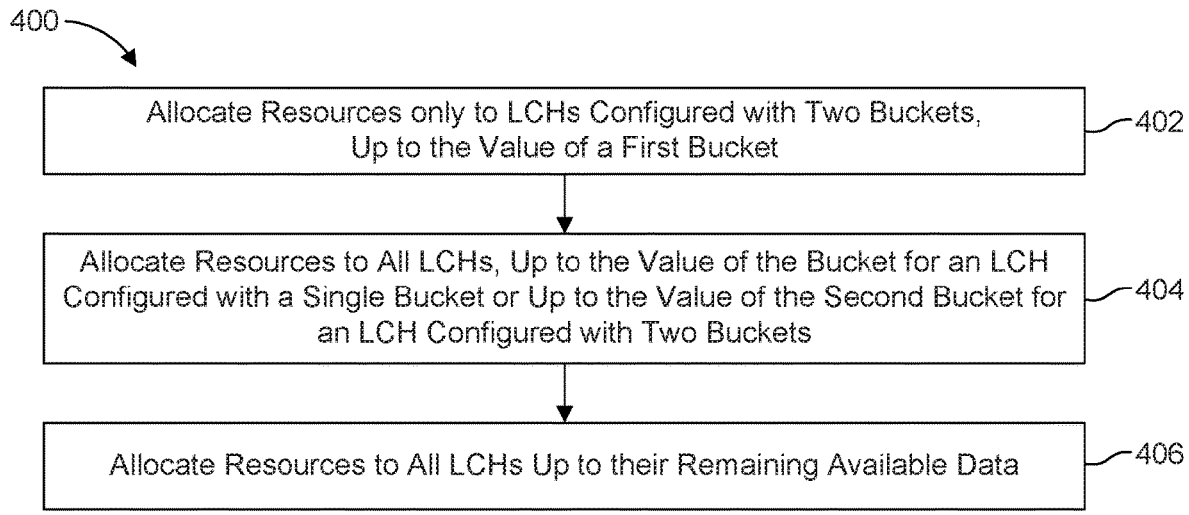
FIG. 4A is a flowchart illustrating a first resource allocation method.

FIG. 4A is a flowchart 400 illustrating a first resource allocation method. In an example procedure, the following steps may be performed. Resources may be allocated 402 only to LCHs configured with two buckets, up to the value of a first bucket. Such bucket may be a specific bucket (e.g. always Bj or always B'j), or may be the bucket with the minimum value. Resources may be allocated 404 to all LCHs, up to the value of the bucket for an LCH configured with a single bucket or up to the value of the second bucket for an LCH configured with two buckets. Resources may be allocated 406 to all LCHs up to their remaining available data. Such example procedures implicitly prioritize LCHs configured with two buckets, which, in general, may be expected to correspond to delay-critical guaranteed bit rate flows. Any one or more of these steps may not be employed in some embodiments and an ordering of these steps may vary in accordance with an embodiment.

Figure 4B:
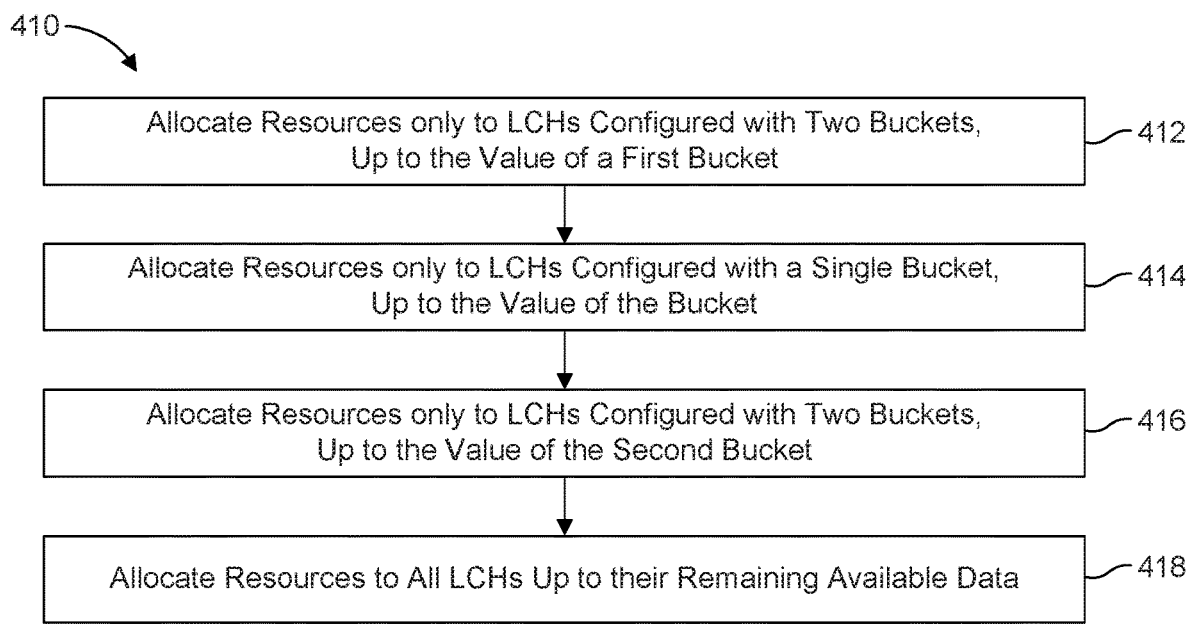
FIG. 4B is a flowchart illustrating a second resource allocation method.

FIG. 4B is a flowchart 410 illustrating a second resource allocation method. In this example procedure, one or all of the following steps may be performed. Resources may be allocated 412 only to LCHs configured with two buckets, up to the value of a first bucket. Such bucket may be a specific bucket, for example, always Bj or always B'j, or may be the bucket with the minimum value. Resources may be allocated 414 only to LCHs configured with a single bucket, up to the value of the bucket. Resources may be allocated 416 only to LCHs configured with two buckets, up to the value of the second bucket. Resources may be allocated 418 to all LCHs up to their remaining available data. Such example procedures implicitly prioritize LCHs configured with two buckets with respect to meeting their minimum requirement. However, LCHs with single bucket are served next to prevent a situation where all resources would be monopolized by the LCHs configured with two buckets. Any one or more of these steps may not be employed in some embodiments and an ordering of these steps may vary in accordance with an embodiment.

The WTRU may further apply the following: After each allocation step, the values of all buckets may be decremented by the total size of the MAC SDU served to the associated LCHs during the step. An allocation step may be performed if and only if resources remain after completion of a previous allocation step.

In another example, the WTRU may be configured to perform a first prioritization round in step 1 for PBR-based prioritization using a first PBR configuration having a first bucket Bj, by considering an applicable LCH(s) as a function of their mapping restrictions, if any, for that round. The WTRU may then perform a second, an additional PBR-based prioritization using a second PBR configuration, for example, using a second bucket Cj, by considering only LCH(s) configured with a second bucket and applicable as a function of their mapping restrictions. In some embodiments, such LCH may be considered if and only if there are no other LCH(s) configured with a single bucket and with a higher priority. In this case, the WTRU may perform a third prioritization round based on absolute prioritization in step 3. In this case, in some embodiments, the WTRU may consider that any LCH configured with more than one bucket should be assigned the lowest priority. In some embodiments, such assignments may be only with respect to LCH(s) configured with a single bucket, for example, the WTRU may maintain the relative priorities between LCHs configured with multiple buckets in that prioritization round.)

A buffer status reporting (BSR) and/or scheduling request (SR) transmission may be made by a WTRU to request transmission resources. For example, in some embodiments, if an LCH/LCG is on hold, data is not considered available for transmission for the LCH/LCG. In some embodiments, the WTRU may consider data as new data available for transmission for the purpose of further determination of whether or not an action, such as a trigger for BSR and/or a scheduling request (SR) or any other available means to acquire more resources should be initiated. A determination of an applicable transmission method for a BSR and/or SR, may be made according to at least one of the following. The WTRU may disable triggering of BSR and/or of SR for an LCH that is suspended. In some embodiments, the WTRU may perform such actions when the LCH may not contend in the PBR-based step of the LCP procedure. (2) The WTRU may consider a change in LCH priority, such as described, herein, when it determines whether or not new data becoming available for transmission should trigger transmission of the BSR and/or SR.

Without limiting the applicability of the methods described herein to specific implementations, embodiments, and/or realizations, this section presents different realizations using the LCP procedure described herein as a baseline.

Some realizations relate to strict negative buckets and absolute prioritization. For example, the following illustrates one example realization of an LCP procedure for an LCH configured with a single bucket, whereby the WTRU enforces an absolute maximum rate for a given flow:

---
Resource Allocation Procedure
---

The MAC entity shall, when a new transmission is performed:
1> allocate resources to the logical channels as follows:
    2> logical channels selected for the UL grant with $Bj > 0$ are allocated resources in a decreasing priority order. If the PBR of a logical channel is set to "infinity", the MAC entity shall allocate resources for all the data that is available for transmission on the logical channel before meeting the PBR of the lower priority logical channel(s);
    2> decrement $Bj$ by the total size of MAC SDUs served to logical channel j above;
    2> if any resources remain, all the logical channels selected with $Bj > 0$ are served in a strict decreasing priority order until either the data for that logical channel or the UL grant is exhausted, whichever comes first. Logical channels configured with equal priority should be served equally.
    2> decrement $Bj$ by the total size of MAC SDUs served to logical channel j above;

NOTE:
The value of $Bj$ may be negative.

Dual (or more) negative buckets and absolute prioritization may be performed in some LCP procedures. For example, the following text illustrates one example realization of an LCP procedure for an LCH configured with dual buckets, whereby the WTRU enforce an absolute maximum rate for a given flow:

---
General
...
The following WTRU variables are used for the Logical channel prioritization procedure:
  $Bj$ which is maintained for each logical channel j;
  $Cj$ which is maintained for each logical channel j for which PBR2 is configured.
The MAC entity shall initialize $Bj$ of the logical channel to zero when the logical channel is established. If PBR2 is configured, the MAC entity shall initialize $Cj$ of the logical channel to zero when the logical channel is established.
For each logical channel j, the MAC entity shall:
1> increment $Bj$ by the product $PBR \times T$ before every instance of the LCP procedure, where T is the time elapsed since $Bj$ was last updated;
1> if the value of $Bj$ is greater than the bucket size (i.e. $PBR \times BSD$):
    2> set $Bj$ to the bucket size.
For each logical channel j for which PBR2 is configured, the MAC entity shall:
1> increment $Cj$ by the product $PBR2 \times T$ before every instance of the LCP procedure, where T is the time elapsed since $Cj$ was last updated;
1> if the value of $Cj$ is greater than the bucket size (i.e. $PBR2 \times BSD2$):
    2> set $Cj$ to the bucket size.
...
Allocation of resources
The MAC entity shall, when a new transmission is performed:
1> allocate resources to the logical channels as follows:
    2> logical channels selected above for the UL grant with $Bj > 0$ and $Cj > 0$ are allocated resources in a decreasing priority order. If the PBR of a logical channel is set to "infinity", the MAC entity shall allocate resources for all the data that is available for transmission on the logical channel before meeting the PBR of the lower priority logical channel(s);
    2> decrement $Bj$ and $Cj$ (if configured) by the total size of MAC SDUs served to logical channel j above;
    2> if any resources remain, all the logical channels selected with $Bj > 0$ and $Cj > 0$ (if configured) are served in a strict decreasing priority order until either the data for that logical channel or the UL grant is exhausted, whichever comes first. Logical channels configured with equal priority should be served equally.
    2> decrement $Bj$ and $Cj$ (if configured) by the total size of MAC SDUs served to logical channel j above;

NOTE:
The value of $Bj$ or $Cj$ (if configured) may be negative.

Loose negative buckets, for example, buckets which may have low negative values may be realized with absolute prioritization in some embodiments. For example, MDBV may be applied on a per period basis, for example, on a TTI, during a transmission duration or for a configured period, while relying on decrementing the LCH's bucket(s) after step 3. A TTI, transmission duration or configured period may vary in accordance with transmission and other network parameters. An example of this is illustrated by the following text for an LCP procedure for an LCH configured with two buckets. Cj is removed for a single bucket implementation.

---
Allocation of resources
---

The MAC entity shall, when a new transmission is performed:
1> allocate resources to the logical channels as follows:
   2> logical channels selected for the UL grant with Bj > 0 and Cj > 0 are allocated resources in a decreasing priority order. If the PBR of a logical channel is set to "infinity", the MAC entity shall allocate resources for all the data that is available for transmission on the logical channel before meeting the PBR of the lower priority logical channel(s);
   2> if any resources remain, all the logical channels selected are served in a strict decreasing priority order (regardless of the value of Bj) until either the data for that logical channel or the UL grant is exhausted, whichever comes first. Logical channels configured with equal priority should be served equally.
   2> decrement Bj and Cj (if configured) by the total size of MAC SDUs served to logical channel j above;

---

NOTE:
The value of Bj or Cj (if configured) may be negative.

The negative value of the bucket(s) may be configured with a minimum bucket level to ensure that the bucket does not go negative to a degree that would starve the logical channel from resources:
The value of Bj or Cj (if configured) may be negative, up to MinimumLevel if configured.

A more lenient implementation of non-strict enforcement of MDBV may penalize resource allocation in step 3 according to the contents of the bucket(s) or according to the prioritized bit rates configured for the buckets. For example, for each LCH configured with MDBV enforcement, the amount decremented from the bucket(s) in step 3 may be according to the following text. Cj may be removed for single bucket LCHs.

---
decrement Bj and Cj (if configured) by the amount of data allocated beyond PBR1 × T, where T is the time elapsed since Bj was last updated;
if Cj is configured, decrement Bj and Cj by the amount of data allocated beyond Cj,
if Bj is less than Cj and Cj > 0; if Cj is configured, decrement Bj and Cj by the amount of data allocated beyond Bj, if Cj is less than Bj and Bj > 0;
if Cj is configured, decrement Bj and Cj by the amount of data allocated beyond |Bj − Cj|;
decrement Bj and Cj (if configured) by the total size of MAC SDUs served to logical channel j, if other LCHs of lower priorities have buffered data;
---

The WTRU may apply these decrements, i.e. may decrement one or a subset of the buckets, depending on the bucket contents for example. The WTRU may apply these additional decrements subject to a configured timer. For instance, the WTRU may apply additional decrements in step 3 if one of the timers described herein is running. Further, the WTRU may further penalize resource allocation for an LCH on which MDBV is enforced if other logical channels with buffered data were not allocated any resources in all or some steps of the LCP procedure. For example, the additional step may be in the following form:

decrement Bj and Cj (if configured) by the sum of Bjs of logical channels with buffered data that were not allocated resources in either step 1 or step 3;

A dynamic change in absolute prioritization may be realized. The change may be based on the LCP of the LCH, based on the data transmission, based on application layer information, based on network signaling or the like. For example, non-strict enforcement of MDBV requirements may be realized by changing LCH priorities in certain step(s) of the LCP resource allocation procedure. For example, after step 2, the priority of an LCH with MDBV enforcement may be changed if one or more of the following apply: (1) Other LCHs of lower priorities (or LCHs with no MDBV enforcement configured) have buffered data. (2) Other LCHs of lower priorities (or LCHs with no MDBV enforcement configured) were not allocated any resources in step 1. (3) The LCH's bucket(s) are empty, negative, or below a configured value. (4) The LCH is configured with more than one bucket. (5) If Cj is less than the Bj and $PBR_{Cj} > PBR_{Bj}$.

An example of such conditions may be illustrated by the following step after step 2:

---
Other logical channels not configured with MDBV enforcement have buffered data
Other logical channels not configured with MDBV enforcement were not allocated data
Bj or Cj (if configured) <= 0
Bj or Cj (if configured) < MinimumLevel
Cj < Bj and PBR2 > PBR 1, if PBR2 is configured
Other logical channels with lower priorities have buffered data
Other logical channels with lower priorities were not allocated data
---

A more dynamic prioritization may be performed in embodiments, for example, by considering the bucket contents of each logical channel. For example, logical channel priorities may by adjusted dynamically prior to a given step in LCP, where priorities, high to low, are assigned by descending order of Bj (or min{Cj,Bj} if both are configured), by descending order of the max{Cj, Bj}, if both are configured, and/or by descending order of backlog (Bj plus the buffered data amount for the logical channel).

For example, such may be illustrated by the adding the following step after step 2:
Adjust logical channel priorities from high to low in descending order of min{Bj, $C_j$}

The WTRU may further apply LCH priority changes subject to a configured timer. For example, the WTRU may apply LCH priority changes in step 3 if one of the timers described herein is running.

Time-based multiplexing restrictions may be considered in LCP. For example, a WTRU may be configured such that it may not update a bucket ahead of every instantiation of the LCP procedure. This may be useful as a means for the network to further control the filling of the bucket, thereby possibly shaping the traffic patterns. For example, this may be useful to enforce burstiness for a given flow, or to smoothen it. It may be useful for the NW to enforce burstiness such that the SDU discard function of PDCP may trigger SDU discard on some or any amount of data that exceeds the MDBV. In such cases, the NW scheduler may serve the LCH up to its PBR in step 1 while precluding the LCH from contending for resources in other steps, for example, step 3. In that manner, there may be less of a need for an additional bucket to enforce MDBV for the purpose of precluding the flow from misbehaving in terms of maximum rate. For example, such conditions can be illustrated as per the following text:

---

The MAC entity shall initialize Bj of the logical channel to zero when the logical channel is established.
For each logical channel j, the MAC entity shall:
increment Bj by the product PBR × T before every instance of the LCP procedure, where T is the time elapsed since Bj was last updated. If a minimum updating interval Tj is configured, T shall be set such that Bj is incremented before the first instance of the LCP procedure such that T >= Tj;
1> if the value of Bj is greater than the bucket size (i.e. PBR × BSD):
    2> set Bj to the bucket size.

---

NOTE:
The exact moment(s) when the WTRU updates Bj between LCP procedures is up to WTRU implementation, as long as Bj is up to date at the time when a grant is processed by LCP.

Some realizations relate to logical channel prioritization in NR MAC. For example, such realizations are illustrated by the following:

---

Multiplexing and assembly
Logical channel prioritization
General
The Logical Channel Prioritization procedure is applied whenever a new transmission is performed.
RRC controls the scheduling of uplink data by signalling for each logical channel per MAC entity:
    priority where an increasing priority value indicates a lower priority level;
    prioritizedBitRate which sets the Prioritized Bit Rate (PBR);
    bucketSizeDuration which sets the Bucket Size Duration (BSD).
RRC additionally controls the LCP procedure by configuring mapping restrictions for each logical channel:
    allowedSCS-List which sets the allowed Subcarrier Spacing(s) for transmission;
    maxPUSCH-Duration which sets the maximum PUSCH duration allowed for transmission;
    configuredGrantType1Allowed which sets whether a Configured Grant Type 1 may be used for transmission;
    allowedServingCells which sets the allowed cell(s) for transmission.
The following WTRU variable is used for the Logical channel prioritization procedure:
    Bj which is maintained for each logical channel j.
The MAC entity shall initialize Bj of the logical channel to zero when the logical channel is established.
For each logical channel j, the MAC entity shall:
1> increment Bj by the product PBR × T before every instance of the LCP procedure, where T is the time elapsed since Bj was last updated;
1> if the value of Bj is greater than the bucket size (i.e. PBR × BSD):
    2> set Bj to the bucket size.
NOTE: The exact moment(s) when the WTRU updates Bj between LCP procedures is up to WTRU implementation, as long as Bj is up to date at the time when a grant is processed by LCP.
Selection of logical channels
The MAC entity shall, when a new transmission is performed:
1> select the logical channels for each UL grant that satisfy all the following conditions:
    2> the set of allowed Subcarrier Spacing index values in allowedSCS-List, if configured, includes the Subcarrier Spacing index associated to the UL grant; and
    2> maxPUSCH-Duration, if configured, is larger than or equal to the PUSCH transmission duration associated to the UL grant; and
    2> configuredGrantType1Allowed, if configured, is set to TRUE in case the UL grant is a Configured Grant Type 1; and
    2> allowedServingCells, if configured, includes the Cell information associated to the UL grant.
NOTE: The Subcarrier Spacing index, PUSCH transmission duration and Cell information are included in Uplink transmission information received from lower layers for the corresponding scheduled uplink transmission.
Allocation of resources
The MAC entity shall, when a new transmission is performed:
1> allocate resources to the logical channels as follows:
    2> logical channels selected for the UL grant with Bj > 0 are allocated resources in a decreasing priority order. If the PBR of a logical channel is set to "infinity", the MAC entity shall allocate resources for all the data that is available for transmission on the logical channel before meeting the PBR of the lower priority logical channel(s);
    2> decrement Bj by the total size of MAC SDUs served to logical channel j above;
    2> if any resources remain, all the logical channels selected are served in a strict decreasing priority order (regardless of the value of Bj) until either the data for that logical channel or the UL grant is exhausted, whichever comes first. Logical channels configured with equal priority should be served equally.
NOTE: The value of Bj may be negative.
If the MAC entity is requested to simultaneously transmit multiple MAC PDUs, or if the MAC entity receives the multiple UL grants within one or more coinciding PDCCH occasions (i.e. on different Serving Cells), it is up to WTRU implementation in which order the grants are processed.
The WTRU shall also follow the rules below during the scheduling procedures above:
    the WTRU should not segment an RLC SDU (or partially transmitted SDU or retransmitted -continued RLC PDU) if the whole SDU (or partially transmitted SDU or retransmitted RLC PDU) fits into the
remaining resources of the associated MAC entity;
    if the WTRU segments an RLC SDU from the logical channel, it shall maximize the size of
the segment to fill the grant of the associated MAC entity as much as possible;
        the WTRU should maximise the transmission of data;
    if the MAC entity is given a UL grant size that is equal to or larger than 8 bytes while having
data available for transmission, the MAC entity shall not transmit only padding BSR and/or padding.
The MAC entity shall not generate a MAC PDU for the HARQ entity if the following conditions are
satisfied:
        the MAC entity is configured with skipUplinkTxDynamic and the grant indicated to the
HARQ entity was addressed to a cell radio network temporary identifier (C-RNTI), or the grant
indicated to the HARQ entity is a configured uplink grant; and
            there is no aperiodic CSI requested for this PUSCH transmission as specified in TS 38.212
[9]; and
        the MAC PDU includes zero MAC SDUs; and
        the MAC PDU includes only the periodic BSR and there is no data available for any LCG, or
the MAC PDU includes only the padding BSR.
Logical channels shall be prioritized in accordance with the following order (highest priority listed
first):
    C-RNTI MAC CE or data from UL-CCCH;
    Configured Grant Confirmation MAC CE;
    MAC CE for BSR, with exception of BSR included for padding;
    Single Entry PHR MAC CE or Multiple Entry PHR MAC CE;
    data from any Logical Channel, except data from UL-CCCH;
    MAC CE for BSR included for padding.

Figure 5:
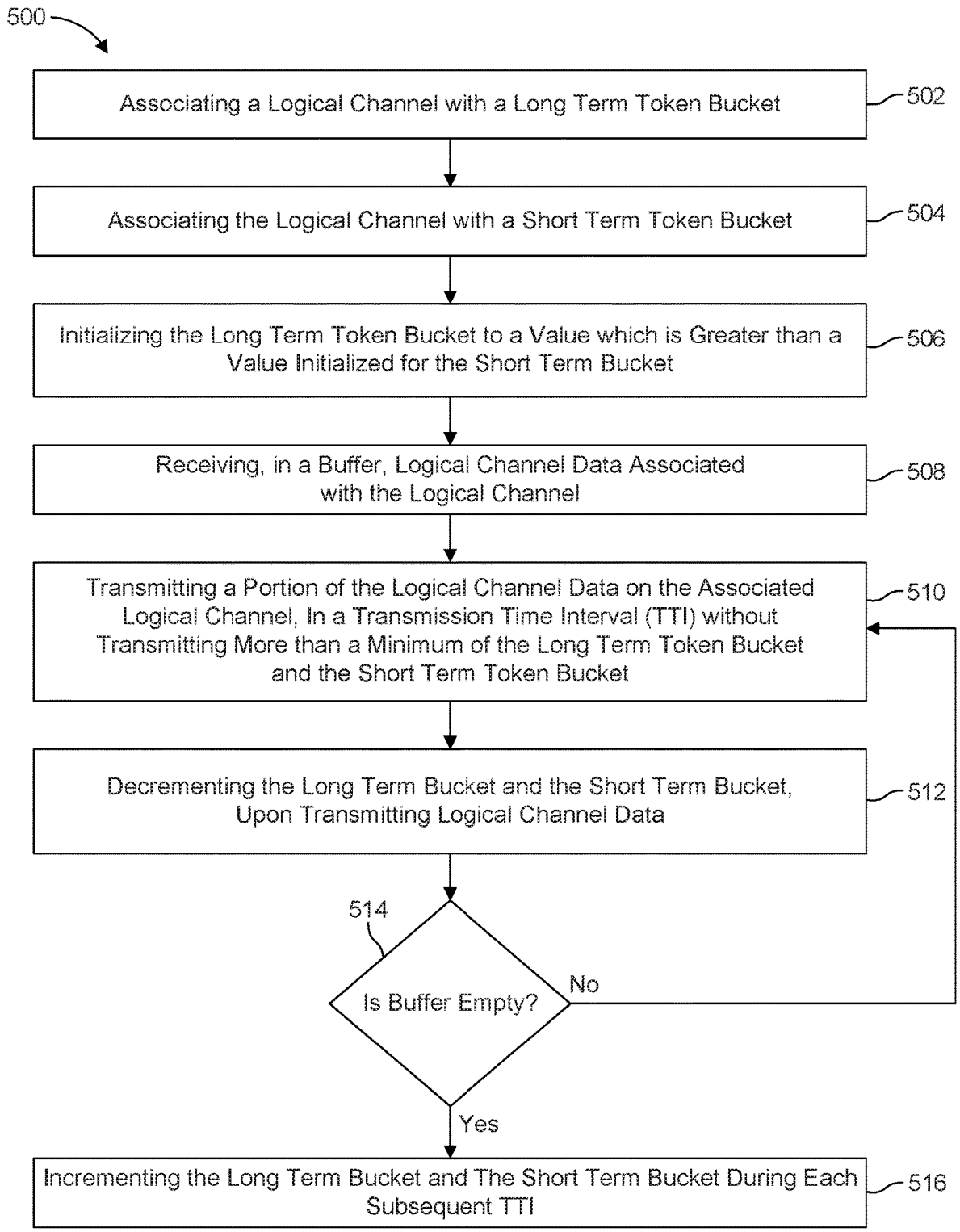
FIG. 5 is a flowchart illustrating a method for transmitting data using a long term token bucket and a short term token bucket.

FIG. 5 is a flowchart 500 illustrating a method for transmitting data using a long term token bucket and a short term token bucket. A WTRU may associate a logical channel with a long term bucket 502 and a short term bucket 504. The long term bucket may be initialized 506 to a value which is greater than a value used to initialize the short term bucket. A buffer, of the WTRU, may become non-empty 508 and may include logical channel data of the logical channel. The WTRU may transmit 510 a portion of the logical channel data on the logical channel, in a TTI without transmitting more than a minimum of a value corresponding to the short term token bucket and the long term token bucket. Upon transmitting data, the WTRU may decrement 512 the long term token bucket and the short term token bucket so that each bucket may further limit a subsequent transmission. If the buffer is empty 514, the long term bucket and the short term bucket may be incremented 516 in each subsequent TTI for which data is not transmitted so that the bucket values may rise back to an initialized value. If the buffer is determined 514 to be non-empty, the WTRU may consider transmitting 510 a next portion of the logical channel data without transmitting more than a minimum of either token bucket.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the method comprising:
    receiving a radio resource control (RRC) configuration message indicating that a logical channel (LCH) is associated with a first bucket and a second bucket;
    incrementing an amount of data in the first bucket at a rate corresponding to a first prioritized bit rate (PBR) when the first bucket is not full and incrementing an amount of data in the second bucket at a rate corresponding to a second PBR when the second bucket is not full;
    receiving an uplink (UL) grant for a transmission in a first transmission time interval (TTI);
    transmitting data on the LCH in the first TTI, using the UL grant, the amount of data transmitted on the LCH in the first TTI being no larger than the minimum of a value corresponding to the first bucket and a value corresponding to the second bucket; and
    decrementing the amount of data in the first bucket and the amount of data in the second bucket, by the amount of data transmitted on the LCH in the first TTI.

2. The method of claim 1, wherein the first PBR is different than the second PBR.

3. The method of claim 1, wherein the first bucket has a different bucket update period than the second bucket.

4. The method of claim 1, wherein the first bucket has a different accumulation rate than the second bucket.

5. The WTRU of claim 1, wherein the first bucket and the second bucket are used in a logical channel prioritization (LCP) procedure.

6. The method of claim 1, wherein the UL grant is received from a base station.

7. The method of claim 1, wherein the decrementing is in accordance with a total number of media access control service data units (MAC SDUs) transmitted on the LCH.

8. A wireless transmit/receive unit (WTRU) comprising:
    a transceiver; and
    a processor;
    the transceiver and processor configured to:
        receive a radio resource control (RRC) configuration message indicating that a logical channel (LCH) is associated with a first bucket and a second bucket;

increment the amount of data in the first bucket at a rate corresponding to a first prioritized bit rate (PBR) and increment the amount of data in the second bucket at a rate corresponding to a second PBR;

a receiver configured to:

receive an uplink (UL) grant for a transmission in a first transmission time interval (TTI); and transmit data on the LCH in the first TTI, using the UL grant, the amount of data transmitted on the LCH in the first TTI being no larger than the minimum of a value corresponding to the first bucket and a value corresponding to the second bucket; and decrement the amount of data in the first bucket and the amount of data in the second bucket, by the amount of data transmitted on the LCH in the first TTI.

9. The WTRU of claim 8, wherein the first PBR is different than the second PBR.

10. The WTRU of claim 8, wherein the first bucket has a different bucket update period than the second bucket.

11. The WTRU of claim 8, wherein the first bucket has a different accumulation rate than the second bucket.

12. The WTRU of claim 8, wherein the data is device to device (D2D) data and transmitted to another WTRU.

13. The WTRU of claim 8, wherein the UL grant is received from a base station.

14. The WTRU of claim 8, wherein the amount of data is in accordance with a total number of media access control service data units (MAC SDUs) transmitted on the LCH.

15. A wireless transmit/receive unit (WTRU) comprising:

a receiver configured to:

receive an uplink (UL) grant for a transmission in a first transmission time interval (TTI); and receive a radio resource control (RRC) configuration message indicating that a logical channel (LCH) is associated with a first bucket and a second bucket a transmitter configured to transmit data on the LCH in the first TTI, using the UL grant, associated with the first bucket and the second bucket, the amount of data transmitted on the LCH in the first TTI being no larger than the minimum of a value corresponding to the first bucket and a value corresponding to the second bucket; and circuitry configured to decrement the first bucket and the second bucket, by an amount of data transmitted on the LCH in the first TTI.

16. The WTRU of claim 15, further comprising:

circuitry configured to increment the first bucket at a rate corresponding to a first prioritized bit rate (PBR) and increment the second bucket at a rate corresponding to a second PBR, wherein the first PBR and second PBR are different.

17. The WTRU of claim 15, wherein the first bucket has a different bucket update period than the second bucket.

18. The WTRU of claim 15, wherein the first bucket has a different accumulation rate than the second bucket.

* * * * *